United States Patent
Sreenivasan et al.

(10) Patent No.: US 10,816,482 B2
(45) Date of Patent: Oct. 27, 2020

(54) HIGH THROUGHPUT, HIGH RESOLUTION OPTICAL METROLOGY FOR REFLECTIVE AND TRANSMISSIVE NANOPHOTONIC DEVICES

(71) Applicant: Board of Regents, The University of Texas System, Austin, TX (US)

(72) Inventors: S. V. Sreenivasan, Austin, TX (US); Brian Gawlik, Austin, TX (US); Shrawan Singhal, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/770,095

(22) PCT Filed: Oct. 26, 2017

(86) PCT No.: PCT/US2017/058573
§ 371 (c)(1),
(2) Date: Apr. 20, 2018

(87) PCT Pub. No.: WO2018/081452
PCT Pub. Date: May 3, 2018

(65) Prior Publication Data
US 2019/0250107 A1 Aug. 15, 2019

Related U.S. Application Data

(60) Provisional application No. 62/413,291, filed on Oct. 26, 2016.

(51) Int. Cl.
*G01N 21/95* (2006.01)
*B82Y 20/00* (2011.01)
(Continued)

(52) U.S. Cl.
CPC .......... *G01N 21/9501* (2013.01); *B82Y 20/00* (2013.01); *G01N 21/21* (2013.01);
(Continued)

(58) Field of Classification Search
CPC .... B82Y 20/00; G01N 21/21; G01N 21/8806; G01N 21/8851; G01N 21/9501;
(Continued)

(56) References Cited

U.S. PATENT DOCUMENTS

| 4,541,716 A | 9/1985 | Crooks et al. |
| 7,433,034 B1 | 10/2008 | Huang |

(Continued)

FOREIGN PATENT DOCUMENTS

| GB | 1406470 A | 9/1975 |
| JP | 2011-169642 A | 9/2011 |

(Continued)

OTHER PUBLICATIONS

Anonymous ("Polarizers," Wayback Machine capture of en.wikipedia.org/Wiki/Polarizer, Oct. 20, 2016) (Year: 2016).*
(Continued)

*Primary Examiner* — Colin W Kreutzer

(57) ABSTRACT

The present disclosure regards a large area functional metrology system for inspecting nanophotonic devices. The large area functional metrology system can include one or more light sources, optical components such as lenses and polarizers, and one or more camera sensors. The light source can irradiate light onto a nanophotonic device while the optical components can guide the light through the system and modulate states of the light. The camera sensor can record images of the nanophotonic device interacting with the irradiated light. The images can be taken as a function of one or more states. The system can also include a detector which can processes the images in order to detect defects.

(Continued)

The defects can then be classified using one or more defect signatures. Based on this classification, the root causes of the defects can be automatically identified.

19 Claims, 19 Drawing Sheets

(51) Int. Cl.
*G01N 21/21* (2006.01)
*G01N 21/88* (2006.01)
*G01N 21/956* (2006.01)
G01N 21/59 (2006.01)
G01N 21/47 (2006.01)

(52) U.S. Cl.
CPC ..... *G01N 21/8806* (2013.01); *G01N 21/8851* (2013.01); *G01N 21/95* (2013.01); *G01N 21/95623* (2013.01); *G01N 21/47* (2013.01); *G01N 21/59* (2013.01)

(58) Field of Classification Search
CPC ........... G01N 21/956; G01N 21/95623; G01N 2021/9511; G03F 7/7065
USPC ................. 355/67, 68, 71; 356/237.3–237.5, 356/239.2–239.3, 430, 435, 448
See application file for complete search history.

(56) References Cited

U.S. PATENT DOCUMENTS

| | | |
|---|---|---|
| 8,670,116 B2 | 3/2014 | Nakao et al. |
| 2002/0118359 A1 | 8/2002 | Fairley et al. |
| 2004/0012775 A1* | 1/2004 | Kinney .............. G01N 21/9501 356/237.2 |
| 2004/0081221 A1 | 4/2004 | Sandvoss |
| 2009/0288754 A1* | 11/2009 | Kobayashi ............ G01N 21/21 156/64 |
| 2011/0234673 A1 | 9/2011 | Ueshima |
| 2014/0125975 A1 | 5/2014 | Hsieh et al. |

FOREIGN PATENT DOCUMENTS

| | | |
|---|---|---|
| KR | 10-1249119 B1 | 3/2013 |
| KR | 10-1374509 B1 | 3/2014 |
| WO | 2011/061911 A1 | 5/2011 |

OTHER PUBLICATIONS

European Patent Application No. 17866088.2, Extended European Search Report, 8 pages, dated Oct. 10, 2019.
International Application No. PCT/US2017/058573, International Preliminary Report on Patentability, 55 pages, dated Mar. 4, 2019.
Korean Patent Application No. 2019-7014954, Office Action, 15 pages, dated Jun. 18, 2020.

* cited by examiner $T_P$ (TRANSMISSION OF P-POL LIGHT)

$T_S$ (TRANSMISSION OF S-POL LIGHT)

$T_P$ (TRANSMISSION OF P-POL LIGHT)

$T_S$ (TRANSMISSION OF S-POL LIGHT)

$T_P$ (TRANSMISSION OF P-POL LIGHT)

$T_S$ (TRANSMISSION OF S-POL LIGHT)

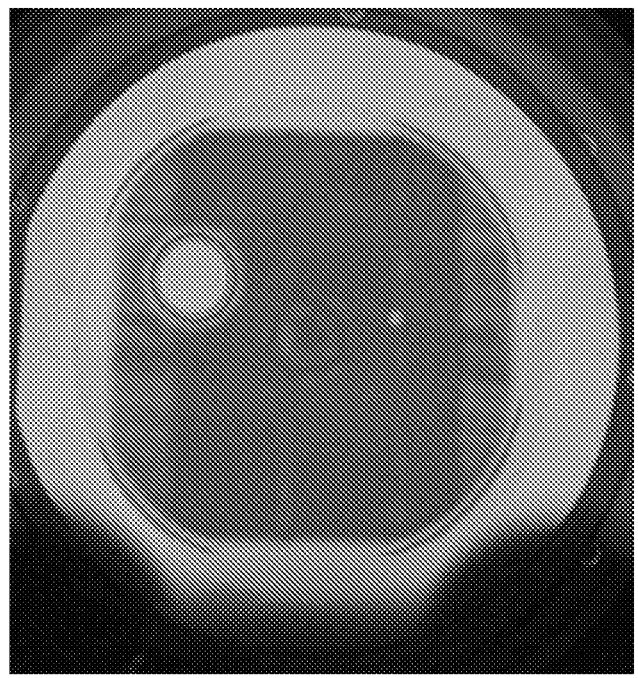
FIG. 14
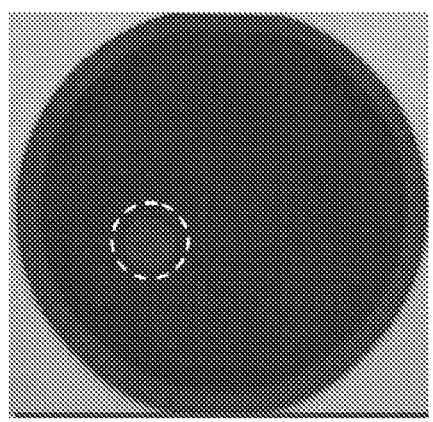 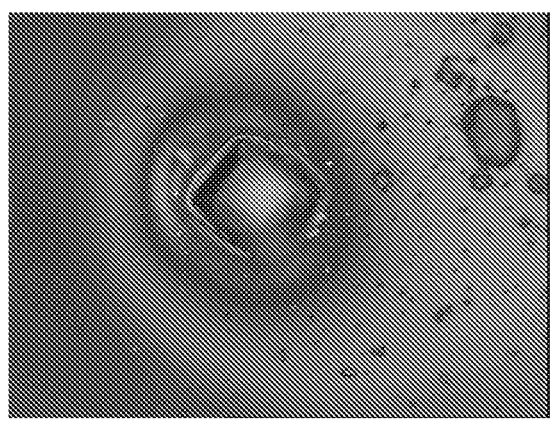
FIG. 15A  FIG. 15B

HIGH THROUGHPUT, HIGH RESOLUTION OPTICAL METROLOGY FOR REFLECTIVE AND TRANSMISSIVE NANOPHOTONIC DEVICES

CROSS REFERENCE TO RELATED APPLICATIONS

This application claims the benefit of U.S. Provisional Patent Application Ser. No. 62/413,291 filed Oct. 26, 2016, the disclosure of which is expressly incorporated herein by reference.

STATEMENT REGARDING FEDERALLY SPONSORED RESEARCH

This invention was made with government support under Grant numbers ECCS1120823 and EEC1160494 awarded by the National Science Foundation. The government has certain rights in the invention.

FIELD

The present disclosure relates to optical metrology for nanophotonic devices.

BACKGROUND

Recent advances in nanofabrication are paving the way towards manufacturing a host of nanophotonic devices on wafer-scale, roll-to-roll (R2R), and sheet-to-sheet (S2S) manufacturing lines. These nanophotonic devices include nanofabricated polarizers (NFP) which can reduce power consumption in liquid crystal displays (LCD) by up to 20%, metal mesh grids which enable flexible touch screens and displays, perfect absorbers like black silicon, and various metallic and/or dielectric nano-structural colors which may be useful as color filters in ultra-high resolution and/or micro-displays and prints or in spectral camera sensors.

Nanofabrication processes include slot-die coating, ink-jetting, gravure coating, dip coating, and knife-edge coating. Vacuum nanofabrication processes include vacuum deposition processes such as sputtering, e-beam evaporation, glancing angle sputtering, glancing angle e-beam evaporation, thermal evaporation, atomic layer deposition, chemical vapor deposition, and plasma-enhanced chemical vapor deposition; plasma etch processes such as reactive ion etching, inductively or capacitively coupled plasma reactive ion etching, and ion milling; vacuum patterning processes such as electron-beam lithography, x-ray lithography and ion-beam lithography. Additionally, ambient nanopatterning processes include photolithography, imprint lithography, isotropic wet etch techniques, and anisotropic wet etch techniques such as crystallographic etching and metal-assisted chemical etching.

Metrology will be needed on these manufacturing lines to provide quality control and provide a means for yield management in which defective devices are identified and the root cause(s) of defectivity can be pin-pointed and corrected. The metrology must do characterization at high throughput in order to keep pace with the fabrication line, and its data must be spatially resolved so that small defects and subtle area-to-area variations can be successfully identified. As we will show, functional metrology for nanophotonic device can accomplish both of these things simultaneously.

The traditional approaches to nano-metrology, which are critical dimension (CD) metrologies like SEM and AFM, will have extreme trouble hitting throughputs necessary to keep pace with nanophotonic device manufacturing lines. SEM, for instance, can only measure CDs with a field-of-view on the order of the CD itself, and thus characterizing large areas at high throughput is nearly impossible. Scatterometry can be used to characterize larger areas and has the potential to utilize imaging techniques to achieve high spatial resolution, but the measurement usually requires acquisition of data at a large number of individual states (like different scattering angles) which are measured sequentially and is followed by an inverse model computation or a look-up table search for the CDs. This inherently limits the throughput of scatterometry.

Critical Dimension (CD) metrologies have trouble scaling with high throughput nanophotonic device manufacturing. Fortunately, CD metrology is not necessary for device characterization. Functional metrology—which as the name implies measures the function of the device—can be used instead, and in this case it is capable of much higher throughput. Functional metrology is routinely used in the semiconductor industry in the form of electrical testing of chips. An electrical test can be done in seconds which can qualify a chip comprised of billions of individual transistors, vias, and interconnects all with important CDs. One could argue that if a chip passes electrical testing it can be assumed that the CDs are at specification without needing to directly measure them. Now, because chip manufacturing lines have hundreds of individual fabrication steps, CD metrology at intermediate steps is still necessary, but in nanophotonic device manufacturing completed devices may require just a handful of fabrication steps. It is most efficient to do functional metrology on the completed nanophotonic devices without intermediary CD metrology.

The systems and methods disclosed herein address these and other needs.

SUMMARY

The present disclosure regards a large area functional metrology system for inspecting nanophotonic devices. The large area functional metrology system can include one or more light sources, optical components such as lenses and polarizers, and one or more camera sensors. The light source can irradiate light onto a nanophotonic device while the optical components can guide the light through the system and modulate states of the light. The camera sensor can record images of the nanophotonic device interacting with the irradiated light. The images can be taken as a function of one or more states. The system can also include a detector which can processes the images in order to detect defects. The defects can then be classified using one or more defect signatures. Based on this classification, the root causes of the defects can be automatically identified.

BRIEF DESCRIPTION OF THE DRAWINGS

The accompanying figures, which are incorporated in and constitute a part of this specification, illustrate several aspects described below.

FIG. 14 is an image of four broad categories of defects. (i) particle causing a circular exclusion zone at the top left corner, (ii) nozzle-nozzle drop volume variation seen in the horizontal stripes that are of varying shades, (iii) inkjet printhead misfire seen in the blue vertical lines, and (iv) sub-optimal imprint force recipe which causes RLT variations seen in the blue annular ring at the center because of hard contact of the template with the wafer.

FIGS. 15A and 15B are images of particle defects. A particle causes a circular exclusion zone where there may not be any features patterned, as seen in the figure on the left. The figure on the right gives a zoomed image of a typical particle that can cause such defects.

DETAILED DESCRIPTION

Figure 1A:
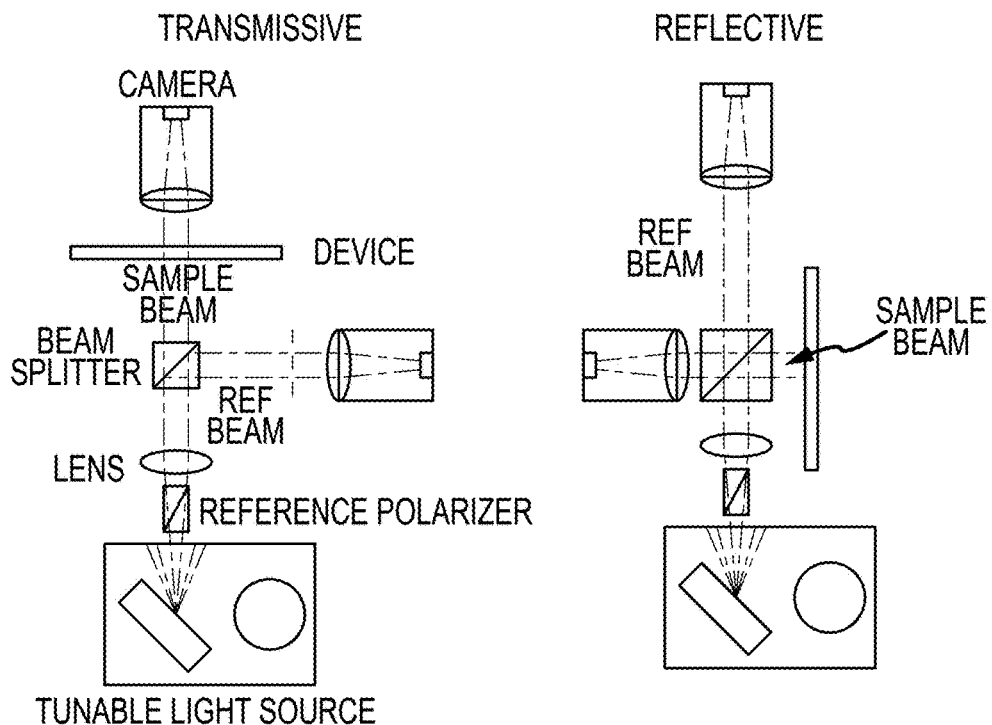
FIGS. 1A and 1B are schematic views of system architectures for transmissive and reflective measurements.

Reference will now be made in detail to the embodiments, examples of which are illustrated in the drawings and the examples. The disclosure, however, may be embodied in many different forms and should not be construed as limited to the embodiments set forth herein.

Unless defined otherwise, all technical and scientific terms used herein have the same meaning as commonly understood to one of ordinary skill in the art to which this disclosure belongs. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

The following definitions are provided to assist with terms used in this specification and are in no way limiting of the disclosure. The definitions serve only as examples of respective interpretations of the terms at hand.

Definitions

Nanophotonic Functional Metrology (NFM)—Functional metrology for nanophotonic devices. NFM records images of a nanophotonic device transmitting, reflecting, diffracting, polarizing, or scattering light as a function of the state and in some cases of a reference in a known state and then processes these images to calculate nanophotonic properties as a function of state.

Nanophotonic Device—A device which has a minimum feature size which is on the order of the wavelength of the light with which it interacts and the geometry or material properties of said features are designed to provide a specific nanophotonic property as an output.

Reference—An artifact which has a substantially known value of one or more nanophotonic properties and images of which are sometimes used as the denominator in the image processing to calculate nanophotonic properties of nanophotonic devices. Examples of references include highly reflective mirrors and air (often used in transmittance measurements to approximate perfect transmittance).

Intensity—A quantity which is proportional to the average light flux which was detected by the camera sensor during the measurement. Abbreviated with I (particularly in table 1). A detailed mathematical description of how intensity is calculated can be found in the section titled "Image Processing".

Nanophotonic Property—A property of the nanophotonic device which is a quantity describing how the nanophotonic device affects the light with which it interacts. Some nanophotonic properties are listed in Table A:

TABLE A

Nanophotonic Properties and Their Quantitative Definition

| Transmittance | $T = \dfrac{I_{sample, transmitted}}{I_{reference}}$ | (Eq. 1)*** |
|---|---|---|
| Reflectance | $R = \dfrac{I_{sample, reflected}}{I_{reference}}$ | (Eq. 2) |
| Absorptance | $A = 1 - I_{Transmittance} - I_{Reflectance}$ | (Eq. 3) |
| Diffraction Efficiency | $\eta_{Diffract} = \dfrac{I_{sample, diffracted}}{I_{reference}}$ | (Eq. 4) |
| Scattering Efficiency | $\eta_{Scatter} = \dfrac{I_{sample, scattered}}{I_{reference}}$ | (Eq. 5) |
| Polarization Efficiency | $\eta_{Polarization} = \dfrac{I_{sample, polarized}}{I_{reference}}$ | (Eq. 6) |
| Polarization Conversion Efficiency | $\eta_{Polarization\ Conv} = \dfrac{I_{sample, polarized}***}{I_{reference, polarized}}$ | (Eq. 7) |
| Contrast Ratio | $CR = \dfrac{I_{sample, transmitted, p-polarized}}{I_{sample, transmitted, s-polarized}}$ $= \dfrac{T_{p\text{-}polarized}}{T_{s\text{-}polarized}}$ | (Eq. 8)**** |
| Haze | $I_{Haze} = \dfrac{\sum I_{sample, scattering\ efficiencies, > 2.0°}}{\sum I_{sample, scattering\ efficiencies, \leq 2.5°}}$ | (Eq. 9) |

*I is the abbreviation for Intensity. See definition of Intensity.
**Sample is a subscript denoting the sample beam, and reference is a subscript denoting the reference beam.
***The polarization state of the sample beam here is different than that of the reference.
****Note that CR can also be calculated from the transmittances of p- and s-polarized light.

State—A characteristic of the light which is interacting with the nanophotonic device or the light which is being detected by the camera sensor. It may include the following:
1. Spectral content of the light irradiating the nanophotonic device
2. Polarization content of the light irradiating the nanophotonic device
3. Angle of incidence the light irradiating the nanophotonic device makes with the nanophotonic device's surface
4. Viewing angle of the camera
5. Range of acceptance angles of the camera
6. Spectral content of the light irradiating the camera sensor
7. Polarization content of the light irradiating the camera sensor.

Light—Electromagnetic radiation including, but not limited to ultraviolet, visible, near infrared, infrared light, etc.

Light Source—Something which produces light.

Optical Components—Something which refracts light (such as a lens), reflects light (such as a mirror), diffracts light (such as a diffraction grating), scatters light (such as a diffuser), and/or modulates the spectral or polarization content of light. These components can be used to control the state of the light.

Camera Sensor—an array of light detectors which sense light. The camera sensor can either be an area sensor or a linescan sensor. Some examples of camera sensors include: Monochrome camera, color camera, RGB camera, three chip color camera, multispectral camera, hyperspectral camera, electron multiplied charge coupled device (EMCCD) camera, intensified charge coupled device (ICCD) camera, electron multiplied intensified charge coupled device camera (emICCD), avalanche photodiode array, time delay integration (TDI) linescan camera, bilinear color linescan camera, trilinear color linescan camera, quadlinear color linescan camera.

Defect—A result of a manufacturing process or the initial substrate which leads to a significant difference from the intended design of said nanophotonic device and causes a difference in a nanophotonic property of said nanophotonic device.

Defect Detection—sensing the presence of an undefined defect.

Defect Identification—knowing the specific type of defect that has been detected.

Root-Cause—The underlying reason for a deviation or an excursion in a nominal fabrication process.

Object Space Pixel Size—the pixel size in an image as mapped to object space (on the nanophotonic device).

Field of view (FOV)—The field of view that the camera lens and camera sensor achieve. In other words, the size of the image recorded by the camera sensor as mapped to object space.

Manufacturing Throughput—the throughput of the manufacturing line which is either areal (m²/s) in the case of wafer-scale manufacturing, or linear (m/s) in the case of R2R manufacturing. S2S manufacturing may operate under both either areal or linear throughput.

Allowable Characterization Time—the time the NFM has to conduct its characterization for each wafer, sheet, or line segment of a roll.

System Characterization Time—the time the NFM actually takes to conduct its characterization for each wafer, sheet, or line segment of a roll.

Wire-grid polarizer (WGP)—a polarizer which is based on metallic lines which are nanoscale in width and macro-scale in length.

Metal mesh grid (MMG)—a transparent conducting surface which based on a grid of nanoscale metallic lines.

Anti-reflector—a nanophotonic device which is anti-reflective due to the presence of nanostructures.

Perfect absorber—a nanophotonic device which is highly absorbing over any specific range or ranges of spectral bands.

Perfect reflector—a nanophotonic device which is highly reflective over any specific range or ranges of spectral bands.

Nanostructural color—a nanophotonic device which has a color which arises due to the presence of nanostructures.

Composition of NFM Systems

An NFM system is comprised of light source(s), optical components, and camera sensor(s):

Light Source(s)

One or more light sources are used to produce light which illuminates the nanophotonic device. The light sources need to be chosen to have appropriate spectral characteristics, intensity, and form factor. Any number of different types of light sources may be used depending on what makes the most sense for the given situation. Some examples of light sources include: Incandescent light source, halogen lamp, arc lamp, a fluorescent lamp, LED (light emitting diode), white LED, array of LEDs, OLED (organic LED), tunable light source, laser, tunable laser, supercontinuum laser.

Optical Components

In most systems there will be optical components to guide and modulate the light as it travels from the light source, to the sample, and to the camera. Various optical components may be utilized to get a particular result including the following: lens, polarizer, beamsplitter, mirror, semi-transparent mirror, focusing mirror, diffraction grating, color filter, iris, aperture, or slit.

Camera Sensor(s)

Camera sensors, which are array detectors, are used as opposed to non-array detectors because they enable fast, simultaneous acquisition of spatially resolved measurements. It's important for the characterization to be spatially resolved so that defects can not only be detected but also identified in terms of their spatial signature. This allows for differentiation between different types of defects (round, linear, periodic, etc.) which allows insight as to where the defects originated (root-cause analysis). Most classic spectrophotometer systems use non-spatially-resolved detectors.

Figure 2:
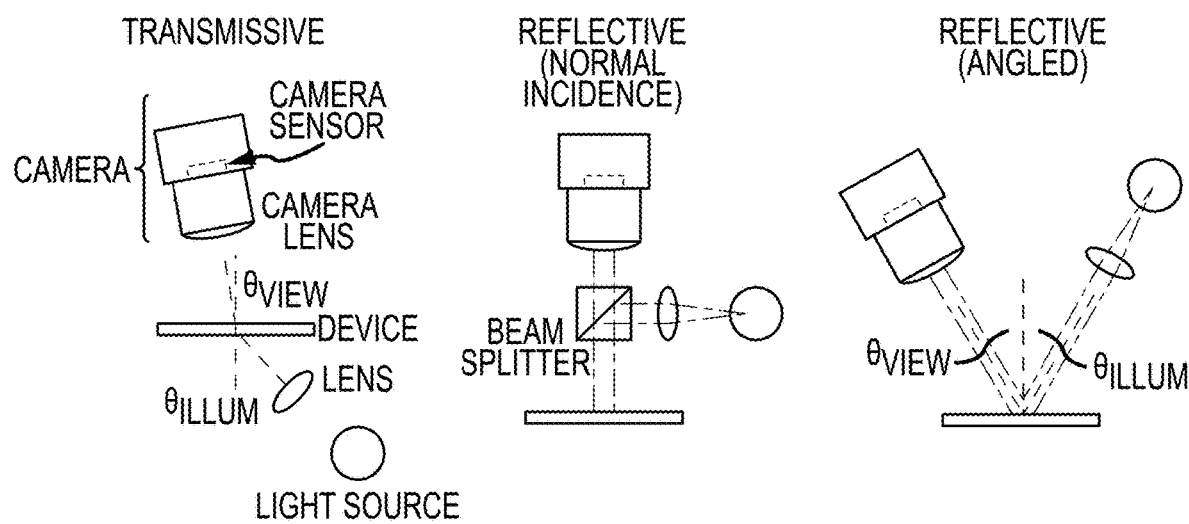
FIG. 2 is a schematic view of a general system architecture for transmissive and reflective measurements.

FIG. 2 shows simple designs of NFM systems for both transmissive, normal incidence reflective measurements, and angled reflective measurements. The systems shown contains the three components just mentioned. Note that these systems are shown with a single beam architecture—later we will discuss the advantages of using a dual-beam architecture. The ability of the system to define the state is partially illustrated in the various examples by showing the beam having different colors and incidence angles and the camera having different viewing angles. Various optical components like lenses and beam splitters are used to make each setup possible. Note that this figure does not exhaustively illustrate all the various states and optical components that can be utilized. For instance, the polarization content of the beam is not illustrated in FIG. 1A. Note that the combination of the camera sensor and the camera lens is often just referred to as a camera. This is shown in FIG. 2, and throughout this document we may use the term camera to identify this subsystem.

NFM System Measurement Process

The following list describes the measurement conducted by an NFM system:

1. One or more light sources produce light
2. The light from the light source(s) may or may not be guided or modulated by optical components (oftentimes at this point a lens is used to focus or collimate the light from the light source)
3. The light then interacts with the nanophotonic device and/or the reference
4. The light after which it has interacted with the nanophotonic device or the reference may or may not be guided or modulated by optical components. (usually at this point a lens focuses the light onto the camera sensor)
5. The light then is detected by the camera sensor(s) during an exposure time
6. The camera sensor reading(s) is(are) then read out as images to a computer
7. The images are processed to calculate intensities (see section titled image processing)
8. The intensities are used to calculate nanophotonic properties

Image Processing

The images from the camera acquisitions need to undergo some processing to turn them into intensity images so that they can be used to calculate nanophotonic properties. There are a few reasons why this must be done. For one the dynamic range of camera sensors can be relatively small. In order to measure a large range of light levels, a combination of neutral density (ND) filters, irises, and the exposure time and gain settings on the camera are used. Really bright measurements, like reference measurements, require ND filters and/or an iris to attenuate the beam such that an exposure time within the camera's range of usable exposure times can be used. On the other hand, really dim measurements can be so dim that the camera can only get an image by using long exposures and/or high gain and thus no ND filters are needed. The difference in gain, exposure time, and the presence of ND filters or irises need to be accounted for in the calculation of intensities. Also, the read noise and dark noise of the camera needs to be taken into account as well. The images undergo the operation seen in the following equation to produce an image of the intensity.

$$I = (DN - Noise_{read} - Noise_{dark}) * \frac{10^{Gain/10}}{t_{exp}} * T_{ND} * T_{Iris} \quad \text{(Eq. 10)}$$

Where:
I Intensity
DN Stands for digital number (a pixel value in the image)
$Noise_{read}$ The read noise of the camera
$Noise_{dark}$ The dark noise of the camera
Gain Camera gain
$t_{exp}$ Camera exposure time
$T_{ND}$ Transmittance of the ND filter
$T_{Iris}$ Transmittance of the Iris This image of intensity values can then be compared directly to any other image of intensity values and can be used to calculate nanophotonic properties like those listed in Table 1 in the Definitions section.

System Design

When designing an NFM system, one goal is to make sure that the system is capable of performing general inspection, defect detection, and defect identification on the nanophotonic device(s) it is intended for. There are a few primary considerations here:

1. The required spatial resolution
2. The required nanophotonic properties that need to be measured
3. The form factor and type of manufacturing motion of the production medium (continuous roll, stop/start)
4. The areal or linear manufacturing throughput of the manufacturing line

Required Spatial Resolution

The required spatial resolution is the most fundamental consideration. The minimum object space pixel size that needs to be measured must be determined and the spatial resolution of the camera needs to be matched to this appropriately. The minimum object space pixel size is determined by the required spatial resolution needed to detect the desired defects in the nanophotonic device. This stems from knowledge of how defectivity manifests itself in the nanophotonic device the system is being designed for. For instance, NFPs and MMGs may be intended for use in displays, so it would make sense to set the minimum object space pixel size to that of something on the order of the size of pixels in displays to make sure that every area which corresponds to an individual display pixel is meeting specifications. Individual defects may actually be much smaller than the spatial resolution of the NFM, but their collective effect will be measured by the NFM as a difference in the nanophotonic property in the pixel within which that defect is located. The resolution capabilities and imaging properties of the camera lens need to be considered so that substantial resolution of the sensor can be utilized. In general, a camera lens should be chosen which can achieve the desired minimum object space pixel size with the maximum FOV.

Required Nanophotonic Properties that Need to be Measured

The type of nanophotonic properties that need to be measured must be considered. This will determine system measurement architecture such as its ability to measure either reflectance and/or transmittance, and system characteristics such as polarization/spectral content of the illumination, the spectral selectivity of the detector, angles of illumination, viewing angles, etc. For instance, NFPs may be characterized by the following two nanophotonic properties: 1. Contrast ratio and 2. Transmittance of p-polarized light. This involves images of 1. The WGP transmitting p-polarized light, 2. The WGP transmitting s-polarized light 3. The reference images to go with them. This system will need to be set up in transmission mode and will need the ability to polarize the light irradiating the WGP.

Form Factor and Type of Manufacturing Motion

The production medium needs to be considered. In general, there are three types of production mediums: 1. Wafer scale, 2. Roll-to-roll (R2R), and 3. Sheet-to-sheet (S2S) processing that will be used for manufacturing of nanophotonic devices. Wafer scale involves fabricating the nanophotonic devices onto discrete wafers which typically start and stop as they move through the manufacturing line. R2R manufacturing involves fabricating the nanophotonic devices onto a continuous roll of material (usually plastic) which is being translated down the manufacturing line in a linear motion, oftentimes never ceasing motion. S2S manufacturing has elements of both of the previous manufacturing mediums where manufacturing is done on discrete sheets of material which may move continuously during their individual patterning steps but which may stop movement in between sheets. System components need to be chosen with these different form factors in mind. For instance, wafer scale manufacturing may lend itself better to area-capture cameras since the wafers typically stop moving in between manufacturing steps and one camera can potentially image an entire wafer in one frame. On the other hand, in R2R manufacturing as well as S2S manufacturing the device may be constantly moving in a linear motion in which case linescan cameras are probably more useful since they are well suited to taking images of linearly translating objects. However, it is possible, and may be more suitable in certain cases to use area-capture cameras for R2R and linescan cameras for wafer-scale.

Manufacturing Throughput

The manufacturing throughput, whether it be areal or linear, must also be considered. Depending on the manufacturing scenario, as much as 100% of the total device area may need to be inspected at the speed of the fabrication line. On the other hand, sampling smaller amounts of the device area may be suitable. Either way, each manufacturing line demands a certain throughput from the metrology. The metrology must meet this throughput or else it will bottleneck the manufacturing line.

The manufacturing throughput (shown as $\text{Thru}_{manufacturing}$ in the equations) can be used to determine the allowable characterization time (shown as $t_{char,allow}$ in the equations). This is shown for the following two embodiments:

In-line characterization for wafer-scale:

$$t_{char,allow}(^s/_{wfr}) = \frac{1}{Thru_{mfg}(^{wfr}/_s)} \qquad \text{(Eq. 11)}$$

In-line characterization for R2R:

$$t_{char,allow}(^s/_{line}) = \frac{1}{Thru_{mfg}(^m/_s)} * h_{line}(^m/_{line}) \qquad \text{(Eq. 12)}$$

Where $h_{line}$ is height of the line as defined by the object space pixel size. Note that for in-line characterization of R2R the roll cannot be made to go backwards so that the metrology may inspect another strip of the roll. Thus, the entire width of the roll may need to be inspected simultaneously as the roll goes by. The system characterization time which is the characterization time achieved by the system (shown as $t_{char,system}$ in the equations) must be less than or equal to the allowable characterization time. The system characterization time is comprised of many different factors described by equation 13.

$$t_{char,system} = \Sigma t_{acquisition} + \Sigma t_{move\ btwn\ states} + \Sigma t_{move\ btwn\ FOVs} \qquad \text{(Eq.13)}$$

Where:
$\Sigma t_{acquisition}$ Is the sum of all the individual acquisition times of every image at each state. The acquisition time is comprised of an exposure wherein the light is sensed, and a readout wherein the image is produced and given to a computer.
$\Sigma t_{move\ btwn\ states}$ Is the sum of the time spent moving between the states. This can be things like:
  Time spent rotating a diffraction grating to change the spectral content of the light in a tunable light source
  Time spent rotating a polarizer to change the polarization content of the light
$\Sigma t_{move\ btwn\ FOVs}$ Is the sum of the time spent moving between different FOVs so that the entire nanophotonic device area can be inspected. This is only necessary when the total sum of all the individual cameras FOVs are smaller than the total device area needing to be inspected.

$\Sigma t_{move\ btwn\ FOVs}$ can be entirely eliminated by deploying one entire system for each FOV that needs to be inspected. For instance, multiple linescan cameras can be placed along the width of a R2R line to inspect the entire roll as it rolls by instead of moving one camera to different points along the width of the roll. Similarly, $\Sigma t_{move\ btwn\ states}$ can also be eliminated by deploying one entire system for each state that needs to be characterized.

Ideas for Improving Throughput
Dual Beam Architecture

Figure 1B:
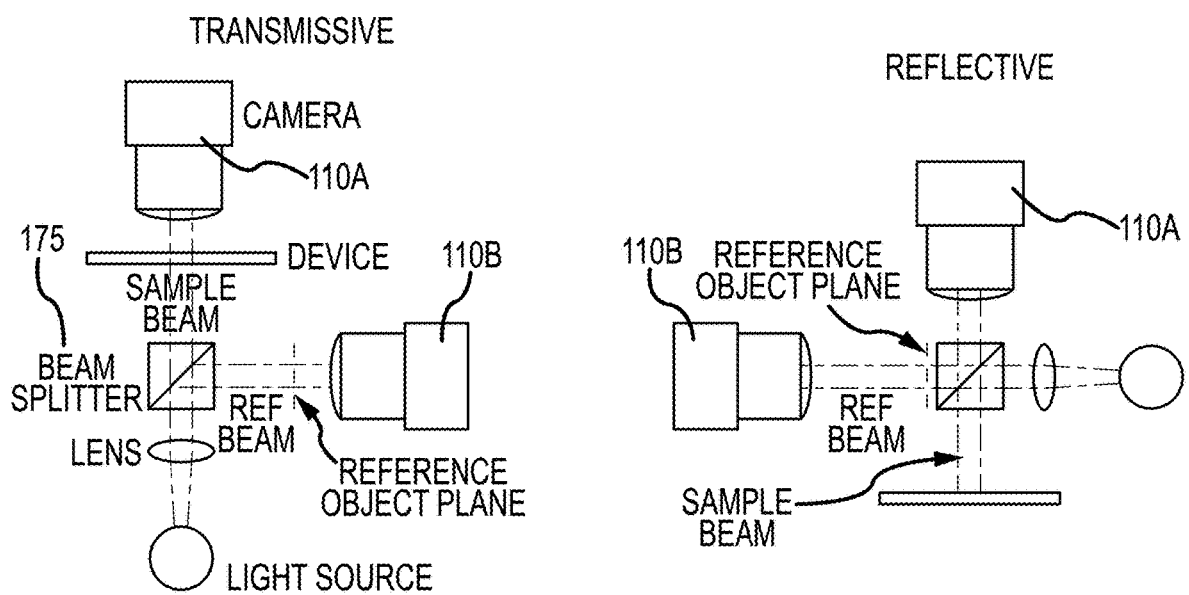

A dual beam architecture of two cameras (110A, 110B) can be used to reduce the system characterization time. In a dual-beam system, reference and sample measurements are made simultaneously (illustrated in FIG. 1B) which eliminates the additional time that comes with doing the measurement sequentially and also eliminates measurement inaccuracy caused by fluctuations in the beam intensity that may occur between the two measurements. In the dual-beam system, a beamsplitter (175) is used to split the light coming from the light source into two different beams—a sample beam and a reference beam. The sample beam goes through the nanophotonic device and the reference beam goes to a camera which measures it as the reference. The optics in the reference beam should replicate the optical path lengths used in the sample beam, except that the object plane in this case is a reference object plane which is either an imaginary plane (notated by the dotted line in FIG. 1B) or a reference object (like a mirror) which is the same distance from the beam splitter center as the device surface, and the reference camera should be the same distance from the reference object plane as the sample camera is from the sample plane. This assures that each camera pixel in the reference beam path is seeing that portion of the beam which corresponds to the same pixel in the sample beam path. This assures successful image calculation of nanophotonic properties. FIG. 1B shows the dual-beam architecture for both transmissive and normal incidence reflective NFM systems.

Binning

Binning can be used to increase the throughput of the NFM system Binning is term used to describe down-sampling image resolution which is done by grouping multiple pixels together in the camera sensor as one. This reduces the spatial resolution, but allows for faster camera readout speed. This may prove to be suitable for defect detection, while the lack of spatial signature may reduce the ability to identify defects and link them to root-causes.

Continuously Rotating Diffraction Grating

It is common in tunable light sources to rotate the diffraction grating in the monochromator in a rotate-stop-rotate fashion. The time spent rotating between different orientations can take a significant amount of time and if there are many spectral bands to be measured this could significantly impact throughput. In multi and hyperspectral situations, it would be beneficial to the system throughput to rotate the diffraction grating continuously and define the spectral bands' widths via the camera's exposure windows. Since the grating motion in this setup is continuous there is no time spent time moving between different spectral bands. In cases where a handful of separated spectral bands need to be measured, the traditional rotate-stop-rotate-stop method is still useful.

Synchronous Movement of the Camera and Beam Along with the Roll or Sheet

If the roll cannot be stopped and the acquisition time is not quick enough to capture the moving subject without blur, the camera (675) and beam can be translated synchronously with the roll to eliminate the relative motion. This is shown for both the transmissive and reflective cases in FIGS. 6C and 6D. The camera can be reset after each forward motion. The setup of FIGS. 6C and 6D includes the above described beamsplitters (695), cameras (675, 650), and both are used to sample images of a specimen across rollers (660A, 660B).

A camera can continuously characterize one column of the roll if the time it takes for the roll to proceed a length equal to the height of the field of view is equal to or less than the characterization time minus the time spent resetting the camera to its initial position.

If one camera cannot cover enough of the roll it can either be scanned back and forth widthwise on the roll or the beam can be parallelized.

The camera can simply be reset after each forward motion, but this movement will take time and it may need to be eliminated. In this case it is recommended that multiple systems located at different positions along the length of the roll be utilized which are staggered such that the latter systems characterize portions of the roll that the prior systems did not.

This synchronous motion strategy can also be used in the case where transient behavior of the nanophotonic device is in question. An example of this would be if the device needed to be measured while undergoing heat cycling or flexing while moving along a R2R system. An area-capture camera can be moved synchronously along with the roll as it undergoes these processes to allow for this.

Miscellaneous
Dealing with Roll Wobble Out-of-Plane

In a R2R or S2S system, the web or sheet has the potential problem of wobbling up and down in the out-of-plane direction potentially resulting in out-of-focus images taken by the camera. This can potentially be solved by using extra rollers to eliminate long stretches of unsupported roll, by sliding the roll over a backing plate, or by using a camera lens which has sufficiently large depth of focus (for instance a telecentric lens). The backing plate could simply be a smooth surface or bearing surface like an air-bearing. In the reflective case the backing plate can be opaque, but in the transmissive case the backing plate would need to be transparent. Alternatively, a partial backing plate can be used which has an exclusion in it where the beam needs to pass through. There could also be some registration marks on the roll or sheet which allow for measurement of the z-position of the roll or sheet at any given moment, and the position of the camera or an optic could be moved in response to this to account for the change in position. (In sheet-to-sheet and wafer-scale systems, a chucking device based on vacuum or electrostatic holding forces may be used to provide such support).

Dealing with Web Walk

Registration marks can be placed on the roll and tracked with a camera or a laser system to track roll movement in-plane in real time. Based on this information a control feedback loop can be established which guides the roll back to its nominal position. This web-guiding can be done with a system such as the one provided by the company Roll-2-Roll Technologies (https://www.r2r-tech.com/content/web-guide-systems-overview).

Constraining Viewing Angle Using Telecentric Lenses

Cameras with normal lenses accept a range of angles of light coming from surfaces. The use of a telecentric lens will help constrain the range of angles to only those which are parallel or very close to parallel to the optical axis of the lens. This can be used in order to inspect specific viewing angles.

Haze Measurement

It is not possible to take a haze measurement according to the widely used ASTM D1003 standard while using imaging techniques. ASTM D1003 defines haze as follows:

"haze, η-in transmission, the scattering of light by a specimen responsible for the reduction in contrast of objects viewed through it. The percent of transmitted light that is scattered so that its direction deviates more than a specified angle from the direction of the incident beam."

Instead, measurements of scattering efficiency above and below some desired cutoff angle (2.5° based on ASTM D1003) can be used. The sum of multiple measurements at a suitable angular resolution can be taken at different viewing angles above and below the cutoff angle and the ratio of the two sums can be used as a parameter that quantifies haze. This is shown in Equation 9.

The numerical aperture of the camera lens needs to be considered to determine the range of angles that will be imaged by the camera to make sure they align as needed with the cutoff angle. A low NA lens or a telecentric lens can be used to substantially reduce the range of acceptance angles to those which are very close to just the on-axis rays. This allows for effective probing of narrow ranges of viewing angles.

Computerized Equipment

Each component described in various metrology architectures of this disclosure may be configured for connection to, operation with, incorporation of, or control of a computer associated with that component. Computers include all kinds of smart devices, without limitation, machines that include a processor, computerized memory, software, computer implemented instructions, and any automation that is accomplished by using computerized instructions stored on non-transitory computer readable media.

Defect Identification and Root Cause Analysis

The images of device nanophotonic properties provide a wealth of information including not only the functional quantity itself but also how it varies over the device area and between separate devices (or areas of a roll or sheet). This information enables not only the detection of defects, but also the identification of defects within and between separate devices. Whereas detection simply signals the presence of a defect, identification adds knowledge about what type of defect the system has detected. The three defect signatures (functional, spatial, and temporal) enable identification of specific types of device defects and allow for determination of the root-cause of the defects. This is crucially important for running effective yield management in nanophotonic device manufacturing. The types of fabrication errors relating to some specific fabrication processes, the defects they create, and their signatures are tabulated in Tables 4-8.

Tables of Process Errors

Imprint Errors

Errors in the overall imprint process can occur during drop dispense (Table 4) or the actual imprinting step (Table 5). These errors usually manifest as areas of missing pattern (due to pull off, trapped air, etc) or cause variations in the residual layer thickness (RLT). RLT variations result in CD changes since the RLT must be removed with a descum etch post-imprint in which features in regions where RLT is thinner become thinned down. Note that many of these errors can be identified immediately after the imprint has been done just by visually examining the quality of the imprint. For instance, adhesion failure is easily identifiable, and the template must be cleaned before further use.

TABLE 4

Inkjet System Errors

| Inkjet System Error | Description | Resulting Device Defect | Functional Signature | Spatial Signature | Temporal Signature |
|---|---|---|---|---|---|
| Full Clog | Nozzle doesn't jet | Missing features | Very poor | Linear, in direction of inkjet motion | Substantially Constant. May resolve. |
| Partial Clog | Drops shoot out at various angles decreasing precision and accuracy (vol. and placement). | CD variation | Variation | Linear, but blurry, in direction of inkjet motion. | Repeating |
| Deviated Nozzle | Row of drops are shifted. Precision maintained, accuracy decreased (location only). | CD variation | Variation | Linear, in direction of inkjet motion | Repeating |
| Drooling | Random parts of wafer receive extra liquid volume. | CD variation Missing features | Variation | Variety of shapes and scales | Random |
| Air trapped inside plumbing | Random nozzles stop firing. | Missing features | Very poor | Linear, in direction of inkjet motion | Worsens wafer to wafer |
| Multiple-dispense pass alignment error (location) | Alignment error in subsequent dispense passes | CD's larger on one half of wafer | Variation | Distinct regions separated by linear step | Repeating |

TABLE 5

Imprint Process Errors

| Inkjet System Error | Description | Resulting Device Defect | Functional Signature | Spatial Signature | Temporal Signature |
|---|---|---|---|---|---|
| Fluid evaporation error | Fluid evaporates unevenly before imprint | CD variation | Variation | Device scale | Random |
| Substrate topography error | Loss of precision in drop location | CD variation | Variation | Often device scale Corresponds to wafer topography error | May repeat |
| Substrate thickness error | Causes loss of precision in drop placement | CD variation | Variation | Wafer scale | Non repeating |
| Particle during imprint (see FIG. 15) | Particle causes exclusion zone during imprint | Missing features | Very poor | Roughly circular for single particle. Fuzzy Edges. Smooth, but non-circ. for multiple particles. Radius = ~1000x particle height. | Repeating. Sometimes clean up after a few imprints Disappears after template clean |
| Template defect | Template delects are created during template fabrication (e-beam) or through damage | Missing features CD variation | Very poor Variation | Variety of shapes and scales. | Repeating |
| Air bubble | Air gels trapped during drop spread | Missing features | Very poor | Very localized, usually micron scale. Well-defined edges. | Non repeating |
| Adhesion failure | Pattern fails to stay on substrate during separation | Missing features | Very poor | Catastrophe large | Random |
| Air paths in spread | Non-ideal spread results in outward air paths | Missing features | Very poor | Radial outward | Repeating |
| Feature collapse during separation | Features collapse | Missing features | Very poor | Not well-defined | Random |

There can also be errors created by non-ideal recipe parameters. The most important recipe parameters are the drop pattern, spread time, and the various imprint forces involved in an imprint. This can also involve mismatch of the drop pattern with any directionality in the template pattern, and can be especially enhanced when imprinting grating features for WGPs. Early work on simulation of the drop spreading process has captured effects of feature size and density on feature filling. These errors and their effects are tabulated in Table 6. Note that all of these errors are repeating temporally, because they are set parameters.

TABLE 6

Imprint recipe errors and the resulting defect/signature

| Imprint Recipe Error | Description | Resulting Device Defect | Functional Signature | Spatial Signature | Temporal Signature |
|---|---|---|---|---|---|
| Non ideal drop pattern | The pattern arrangement of drops | Missing features CD | Very Poor Variation | Local areas Mid-high freq | Repeating |

TABLE 6-continued

Imprint recipe errors and the resulting defect/signature

| Imprint Recipe Error | Description | Resulting Device Defect | Functional Signature | Spatial Signature | Temporal Signature |
|---|---|---|---|---|---|
| | placed on the substrate | variation | | | |
| Non-Ideal Spread time | Total drop spreading time | Missing features<br>CD variation | Very Poor<br>Variation | Localized<br>Sub-mm to mm scale | Repeating |
| Non-Ideal Imprint Forces | Forces at the start, end, and ramp of the spread | CD variation | Variation | Device Scale Sub-mm to mm scale | Repeating |

Etch Process Errors

Most nanophotonic devices need an etch step to transfer the mask features into the underlying substrate. A variety of known errors can happen in the etch process which are tabulated in Table 7 including etching too short/too long, etch profiles, and breakthrough issues.

TABLE 7

Etch Errors and the Resulting Defect/Signature

| Etch Error | Description | Resulting Device Defect | Functional Signature | Spatial Signature | Temporal Signature |
|---|---|---|---|---|---|
| Etch too short | Results in under etch | Device features too short | Off-target | Uniform over device area | Repeats with same etch time |
| Etch too long | Results in over etch | Device features too tall and shrunk | Off-target | Uniform over device area | Repeats with same etch time |
| Etch profile | Etch rate has a profile shape | Device feature CDs vary from center to edge of device | Variation | Center enter to edge (radial) | Repeats with same etch parameters |
| Etched at angle | Substrate was tilted during etch | Device features are slanted | Off-target | Uniform over device area | Repeating or non-repeating |
| Mask doesn't breakthrough | Etch does not go long enough to break through the mask layer | Missing features | Very poor | Patches on a variety of scales | Repeating |
| Particle | Particle masks the etch, preventing feature transfer | Missing features | Very poor | Circular. Close to size of the particle (typically sub-mm) | Non repeating |

Glancing Angle Metal Deposition (GLAD) Errors

One important fabrication step for making some WGPs is GLAD of Aluminum onto a line space pattern which defines the metal lines. This process, similar to etch, can run too short/too long and has profile effects.

TABLE 8

GLAD Deposition Errors and the Resulting Defect/Signature

| GLAD Metal Film Deposition Error | Description | Resulting Device Defect | Functional Signature | Spatial Signature | Temporal Signature |
|---|---|---|---|---|---|
| Deposition Profile | Deposition rate has a profile shape | CDs vary from center to edge of device | Variation | Center to edge (linear) | Repeats |
| Deposition too short | Not enough metal deposited | CDs are too small | Off-target | Uniform over device area | Repeats with same deposition rate/time |
| Deposition too long | Too much metal deposited | CDs are too large, possibly bridging | Off-target | Uniform over device area | Repeats with same deposition rate/time |

Performing Root-Cause Analysis

Figure 5A:
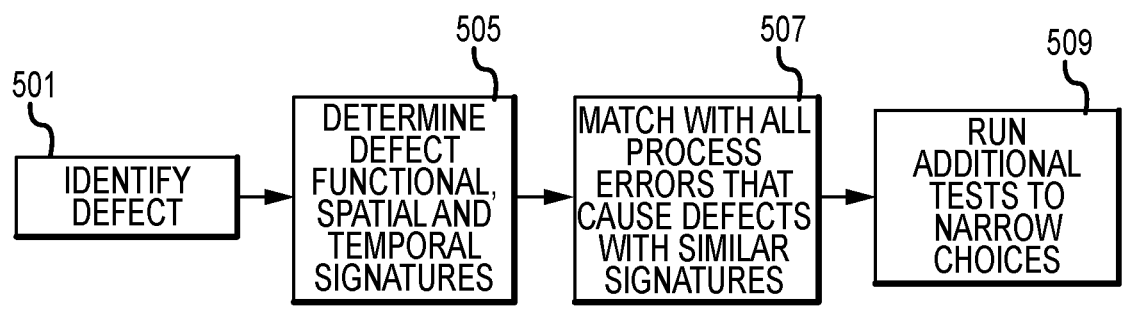
FIG. 5A is a flow chart for a computerized method of identifying defects in a nanophotonic device according to the system and methods disclosed herein.
Figure 5B:
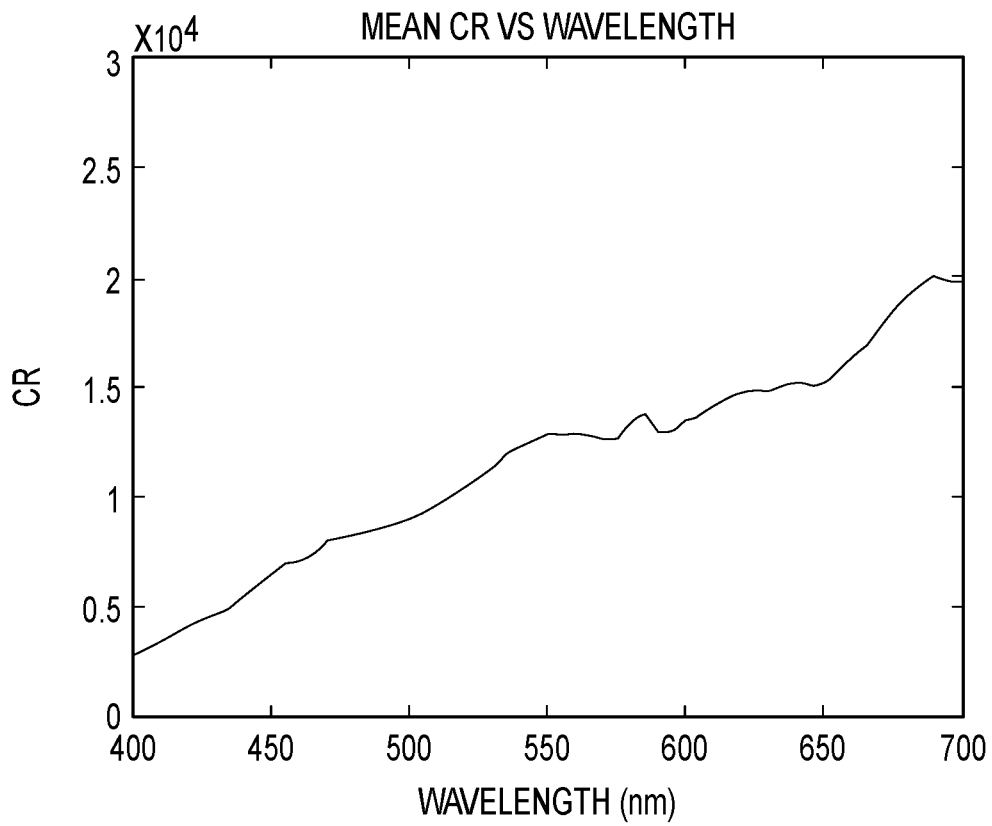
FIG. 5B is an example plot of a mean contrast ratio versus wavelength of sample beam light directed to a nanophotonic device according to the system and methods disclosed herein.
Figure 5C:
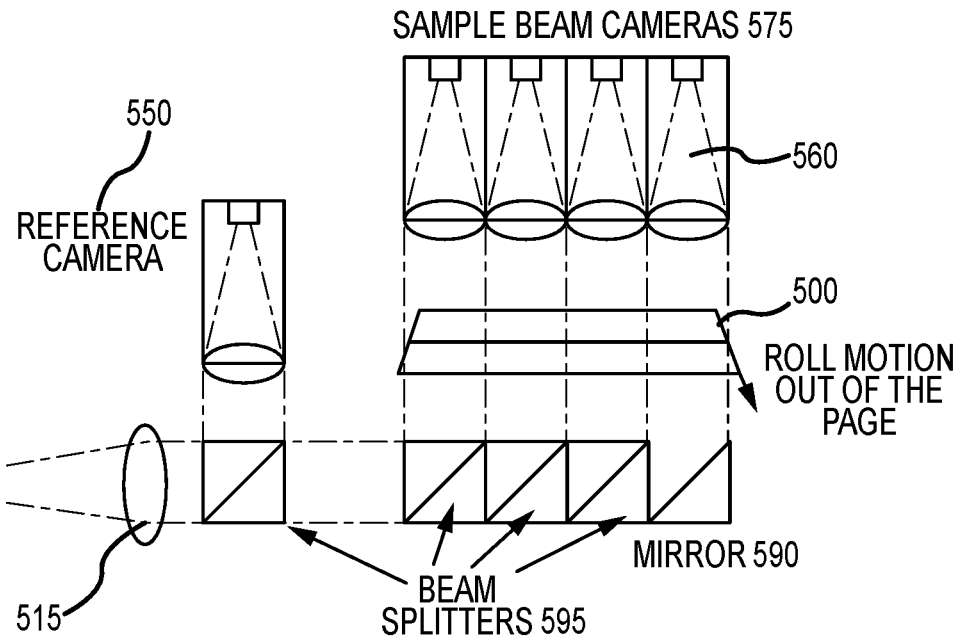
FIG. 5C is an example schematic of a lighting assembly.

Once a batch of devices (or portion of a roll) has been characterized, the nanophotonic property images can be used to identify defects along with their signatures. These signatures can then be used to match the defect to all its possible root-causes (whichever have identical signatures). Multiple matches may be identified as some of the process errors have similar signatures. With some experimentation (clean imprint template, change orientation of wafer during processing) and further insights (inkjets recently replaced, etch chamber reaching end of life, etc.) specific root-causes can be identified and treated. This general process is outlined in the flow chart in FIG. 5A.

Threshold Tests for Defect Identification

Figure 13:
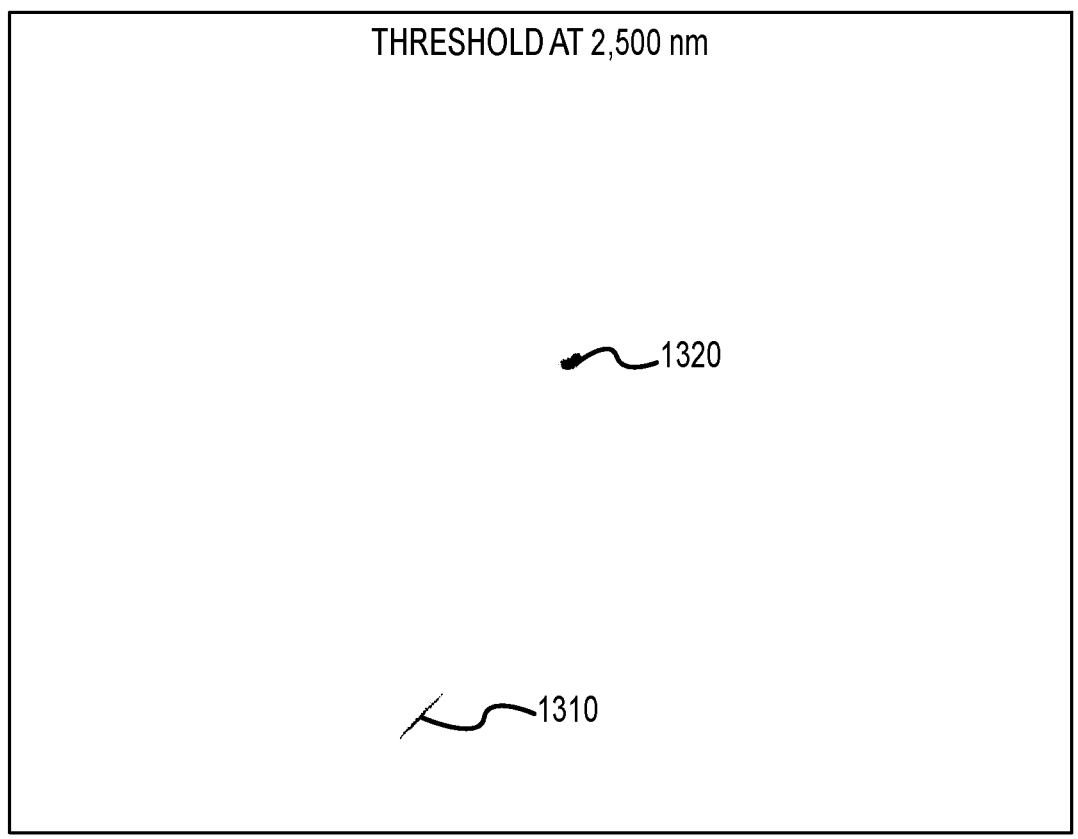
FIG. 13 is an illustration of the image of FIG. 12 in which a threshold value reduces noise and emphasizes defects present in a nanophotonic device of FIG. 4 subject to metrology set forth in FIGS. 6-11.

Simple thresholding tests can be used to determine the presence of certain types of defects and distinguish between different defect types. Tables 4-8 are for generalizing for all nanophotonic devices. For specific devices, the quantity of a functional property which is "very poor", or seen as "variation", or "off target" is defined based on the specific device. In WGPs for instance, a "very poor" functional property would either be a CR close to 1 (almost no polarizing effect), or a $T_p$ close to 0% (no transmission). These would be caused by catastrophic defects such as point defects in which the pattern is substantially compromised. A thresholding operation can be applied to the matrix which contains the data—CR for example—in which a value less than or equal to some small number like 2 is counted and values above 2 are ignored (see FIG. 13). This transforms the matrix into a matrix which only contains defects (1310, 1320) that catastrophically affected CR. These defects are commonly point defects, so this method can be used to isolate point defects from other defects. "Off target" values can be identified by thresholding at a target value for device performance. For instance, WGPs may need to have CR>10,000 and $T_p$>84% to meet industry standards. Thresholds could be placed at these values, and any values less than these would be identified as "off target". This can be used to identify areas of the device that are not passing quality control inspection. "Variation" refers to functional properties which vary in quantity around some value. Thresholding can be done at values of functional properties which are some significant statistical variation away from a target or mean value to identify area of the device that qualify as significantly varied from some nominal value.

Spatial Frequency Domain Analysis

Fourier analysis can be done on the 2D matrices that contain the functional property quantities to identify periodic patterns in the data. This is helpful for identifying certain spatial signatures which occur in certain types of defects. For instance, the periodic pattern seen in FIG. 12 could be identified and the period and direction of the pattern can be quantified by using Fourier analysis.

EXAMPLES

The following examples are set forth below to illustrate the devices, methods, and results according to the disclosed subject matter. These examples are not intended to be inclusive of all aspects of the subject matter disclosed herein, but rather to illustrate representative methods and results. These examples are not intended to exclude equivalents and variations of the present disclosure which are apparent to one skilled in the art.

Example 1. Using NFM for Specific Nanophotonic Device Manufacturing Scenarios

Two exemplary device manufacturing scenarios were chosen for further analysis: wire-grid polarizers (WGPs) on roll-to-roll (R2R) and silicon nanowire (SiNW) arrays on wafer scale. The metrology system is adapted to each of these situations. Each situation has its own minimum device requirements and architectural nuances which help it to achieve suitable throughput. These two examples illustrate the variety of decisions that should be made when designing a system for a specific device like choosing the number of spectral bands, number of systems, number of fields, motion strategies, etc.

Nanofabricated Polarizers on R2R

There can be several types of nanofabricated polarizers (NFPs). For example, wire-grid polarizers (WGPs) and metamaterial polarizers are two types of NFPs. The WGPs are the exemplar NFP discussed in detail herein.

Figures 3A, 3B:
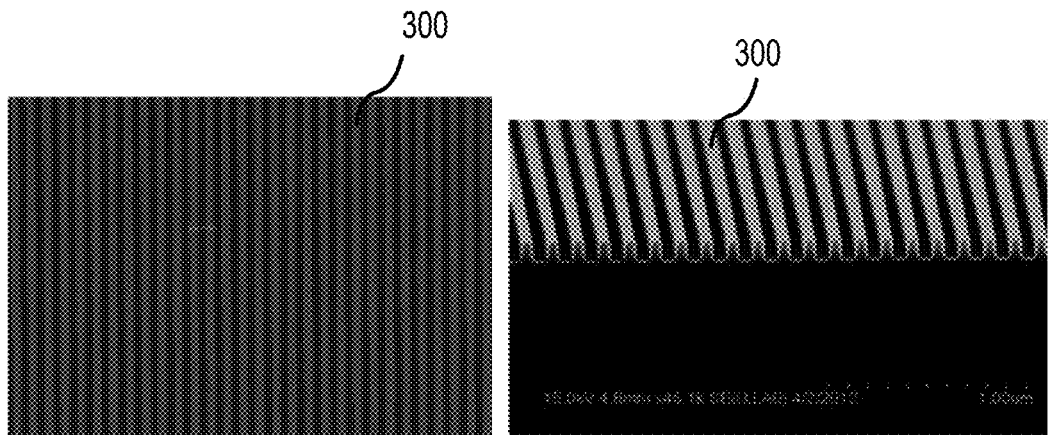
FIGS. 3A and 3B are scanning electron microscopy (SEM) image of wire-grid polarizers (WGPs) on a glass substrate as discussed in this disclosure.
Figure 3C:
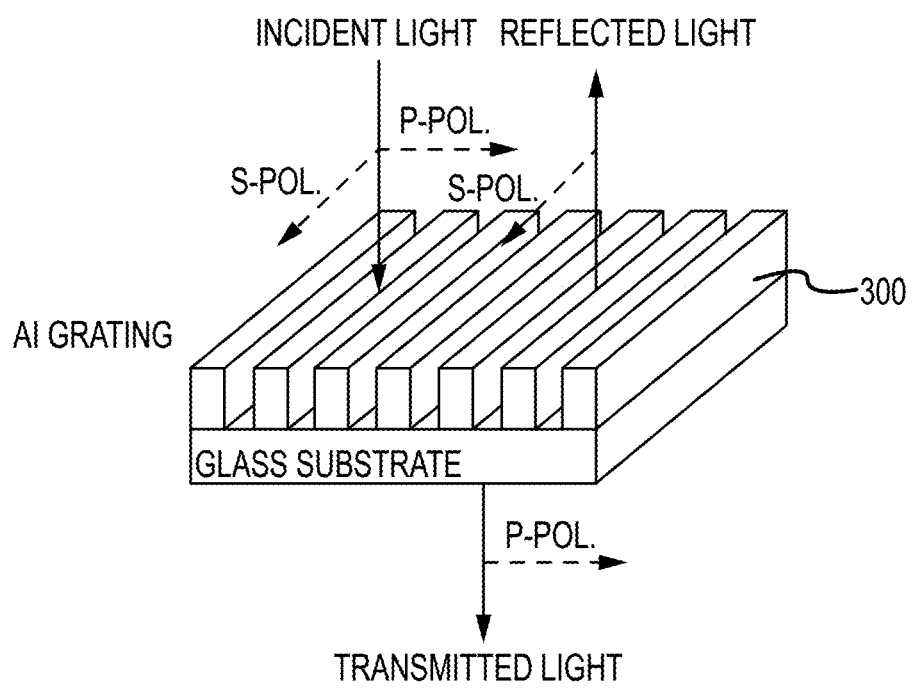
FIG. 3C is a schematic view of a wire grid polarizer optical function as disclosed herein.
Figure 3D:
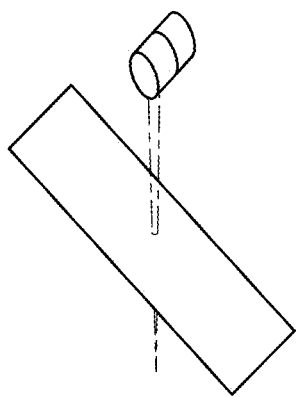
FIGS. 3D and 3E are corresponding views of traditional spectrophotometry measurement tools and a corresponding contrast ratio plot as described in this disclosure.
Figure 3E:
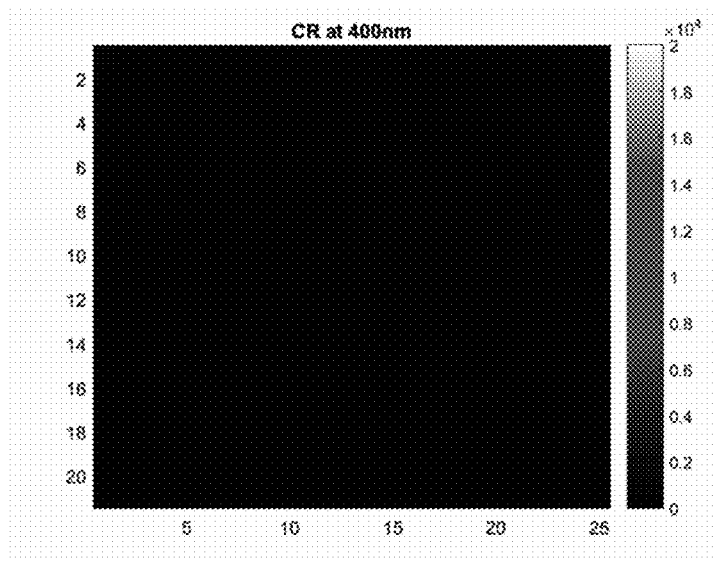
Figure 3F:
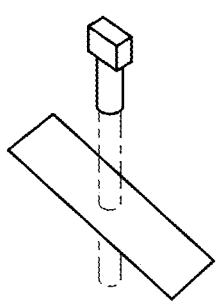
FIGS. 3F and 3G are corresponding views of imaging spectrophotometry measurement tools and a corresponding camera based imaging of the contrast ratio as described in this disclosure.
Figure 3G:
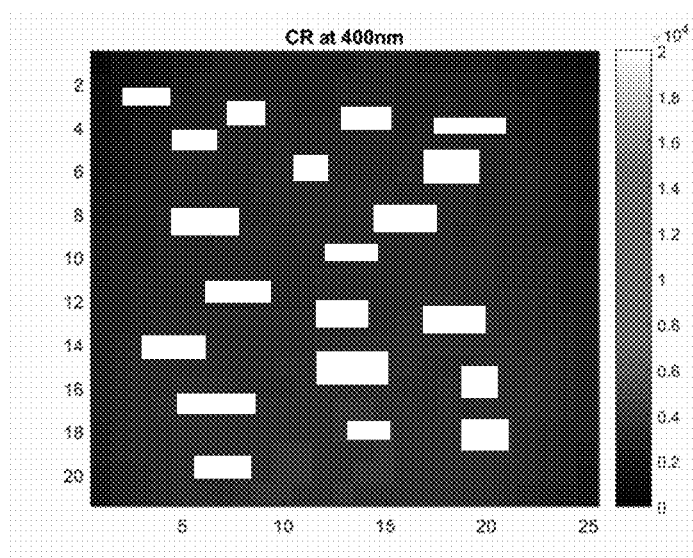
Figure 3H:
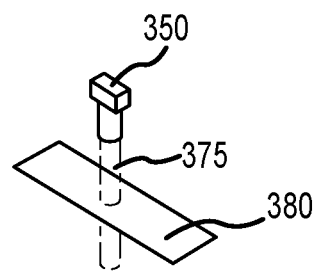
FIGS. 3H and 3I are corresponding views of imaging spectrophotometry measurement tools and a corresponding megapixel (high resolution) camera based imaging of the contrast ratio as described in this disclosure.
Figure 3I:
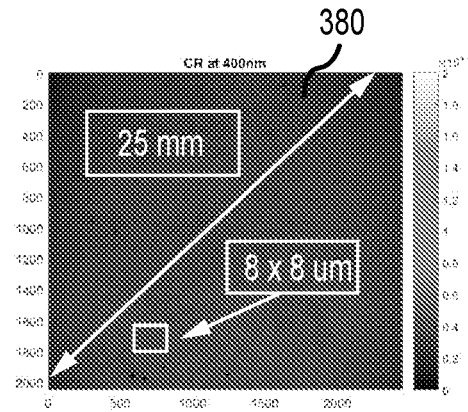
Figure 4:
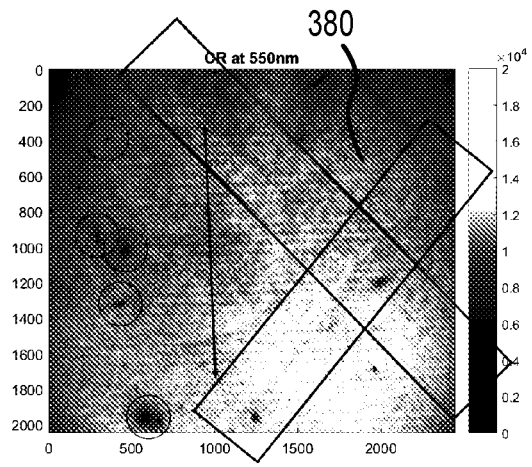
FIG. 4 is an example image of the contrast ratio at a given wavelength using the spectrophotometry of FIG. 3H and identifying defects in a corresponding nanophotonic device as described herein.

WGPs aim to compete with organic back film polarizers currently used in liquid crystal displays (LCD). The goal of a back polarizing film is to transmit light from the backlight while selectively passing p-polarized light. While organic film polarizers absorb s-polarized light, WGPs reflect it back (see FIG. 3C) creating an opportunity to recycle the light and improve power efficiency in LCDs. In order for WGPs to compete with industry polarizers, they must reach certain performance metrics which are as follows: A contrast ratio (CR)≥$10^4$ and a Transmission of p-polarized light (Tp) ≥84%. An SEM of a WGP is shown in FIGS. 3A and 3B.

In order to calculate CR and Tp the system must acquire the following images: 1. The WGP transmitting p-polarized light, 2. The WGP transmitting s-polarized light, and the reference in both cases. In order to do this, one system will be used in which the light irradiating the sample has one or the other polarization state, each of which are dual-beam systems and measure the respective reference simultaneously. The system imaging the WGP transmitting s-polarized light will alone govern the system characterization time, because this measurement will require the longest exposure. We will just use white light to inspect the WGP because the WGP does not have a very useful dependence on spectral content.

Assuming a R2R manufacturing line fabricating NFPs moving at 100 mm/min We will employ a line scan system to do this measurement. Assuming that this system uses one camera which has a wide enough FOV to image the entire width of the roll with an object space pixel size of 20 µm. Based on the roll speed and the height of the pixel, Equation 13 tells us that the allowable characterization time is ~12 ms/line. So, the system imaging the WGP transmitting s-polarized light needs to complete its characterization of each line in 12 ms. A typical linescan camera readout rate can be 100 KHz, so the readout time would be negligible, and since there will be no time spent moving between states nearly the entire 12 ms can be utilized for the camera exposure.

Figure 17:
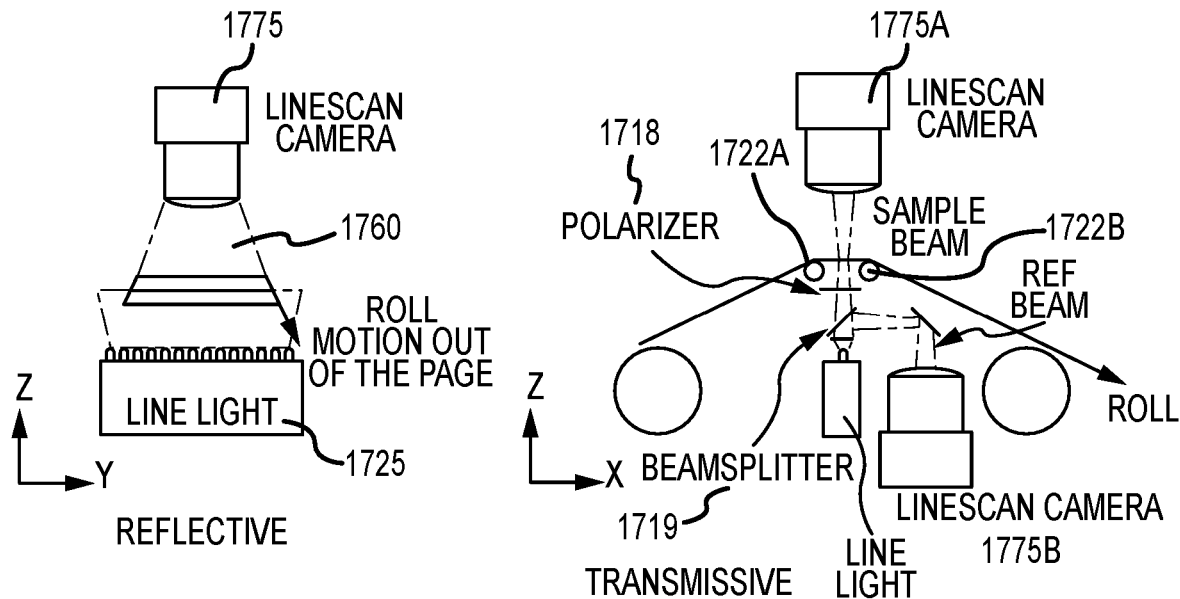
FIG. 17 is a schematic of an exemplary metrology architecture for a roll to roll manufacturing assembly configured to provide image data to calculate contrast ratio and transmission intensities as described herein.

The system herein is illustrated in FIG. 17. Only one system is shown, but a duplicate system with the polarizer in the opposite state would be used further down the roll. Tp can be calculated from the information gathered by the first system according to Equation 1 and CR can be calculated from the Tp and Ts images acquired by each of the systems according to the second part of Equation 8.

Vertical Silicon Nanowire (SiNW) Arrays

SiNW arrays can be used to increase the sensitivity of a variety of gas, biological, and optical sensors. Depending on the geometry, the SiNW arrays can take on vibrant colors (seen in FIG. 16). Because of the nanophotonic function, SiNW arrays can be characterized with NFM.

Figure 16:
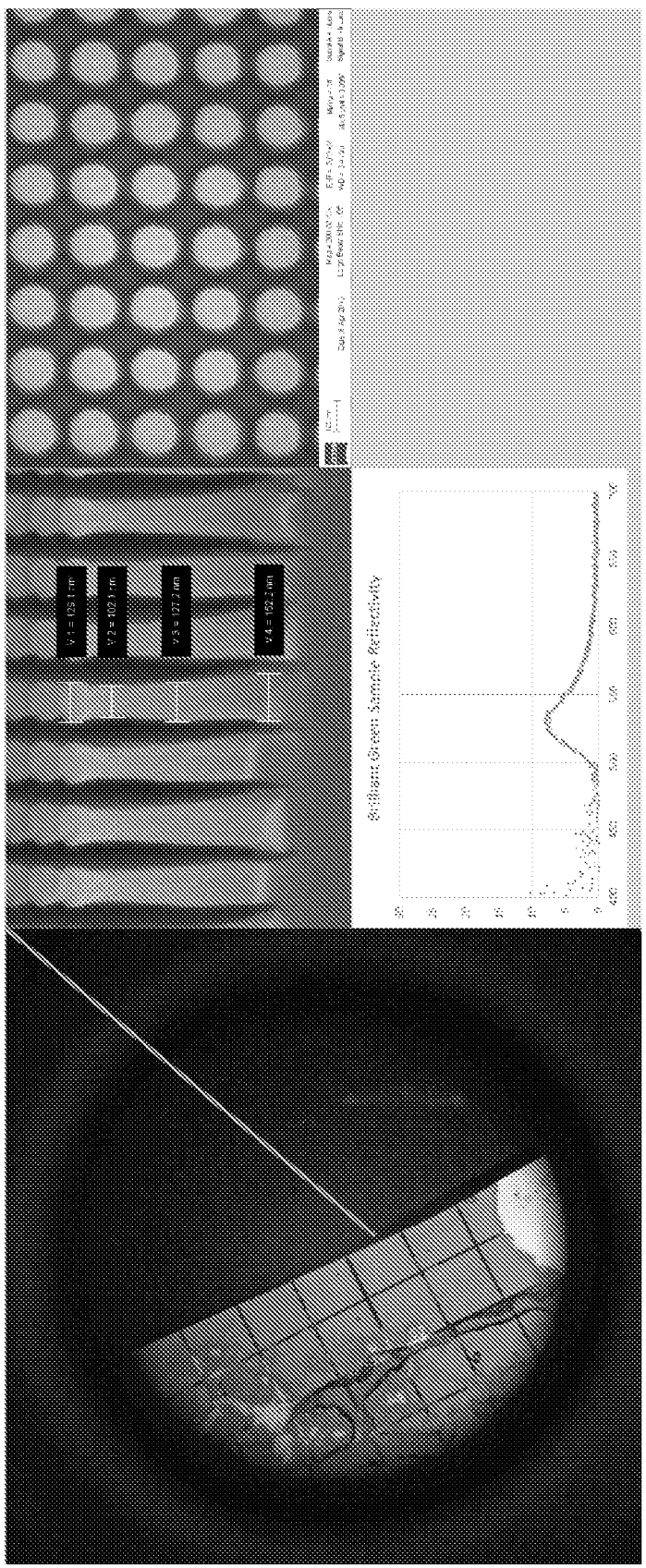
FIG. 16 is a set of RGB (Red, Green, Blue) images of silicon nanowire (SiNW) array samples with their corresponding SEMs and reflectance spectra.
Figure 16:
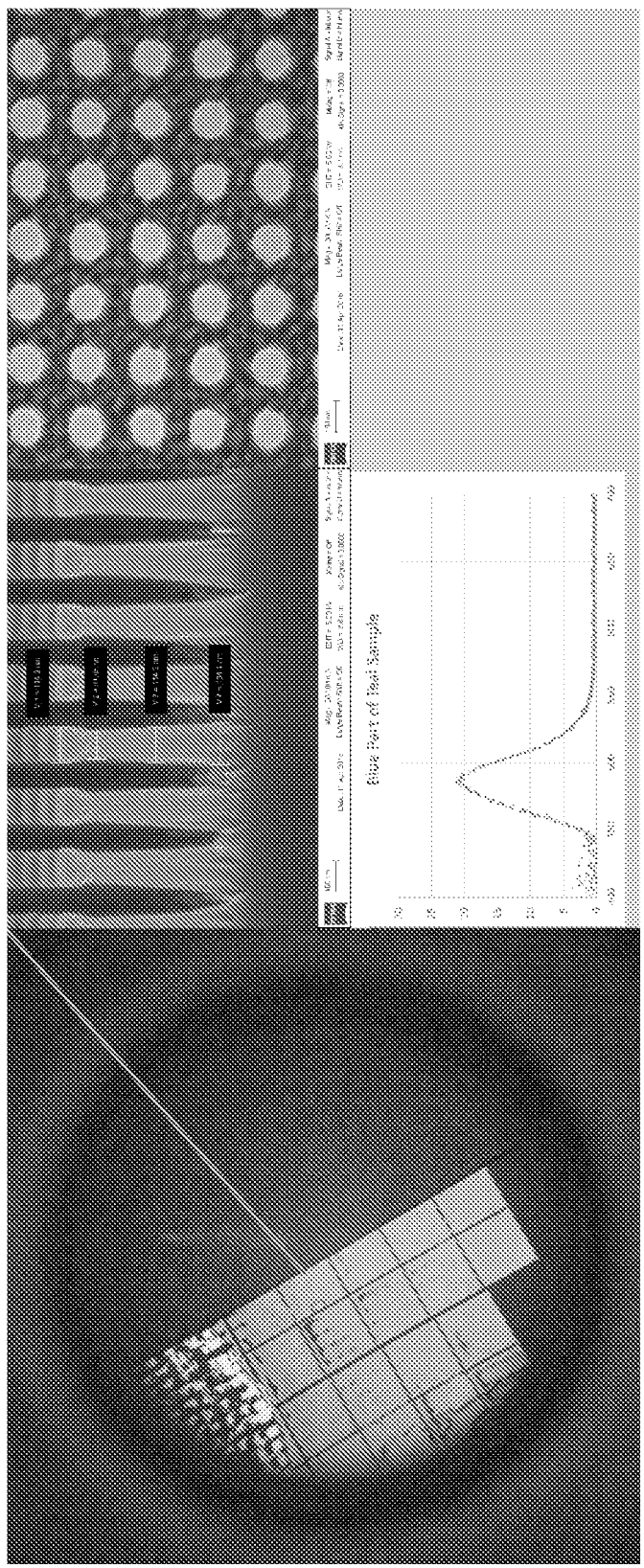
Figure 16:
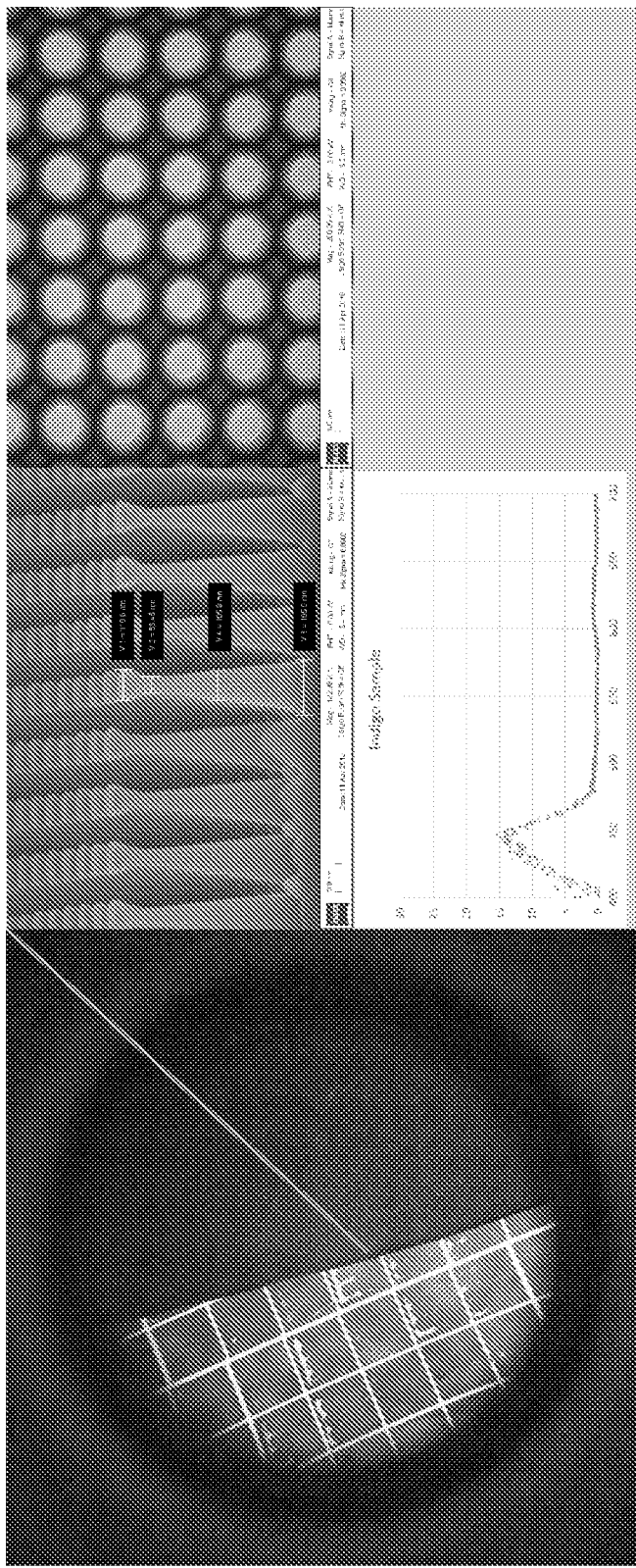

An example of a reflectance spectra for SiNW array samples are shown in FIG. 16. In general, changes in the diameter of the nanowires shifts the peak left/right. In FIG. 16, the thickest nanowires correspond to the reflectance spectrum with the peak centered at the longest wavelength. Changes in the height of the nanowires shift the intensity of the peak up/down. The metrology system must be able to measure the spectral reflectance at enough wavelengths to define the location, spread, and magnitude of the spectral peak. The spectral peaks seen in FIG. 16 can be resolved using just 10 narrow spectral bands (~5 nm each). The metrology checks to see if the peak has shifted or spread which signals CD variations in the nanowires and also for missing features which would likely produce a reflectance spectrum similar to that of the underlying Si substrate. The RGB images in FIG. 16 show a great deal of variation in optical function implying subtle CD changes and areas where there is missing pattern.

Figure 18:
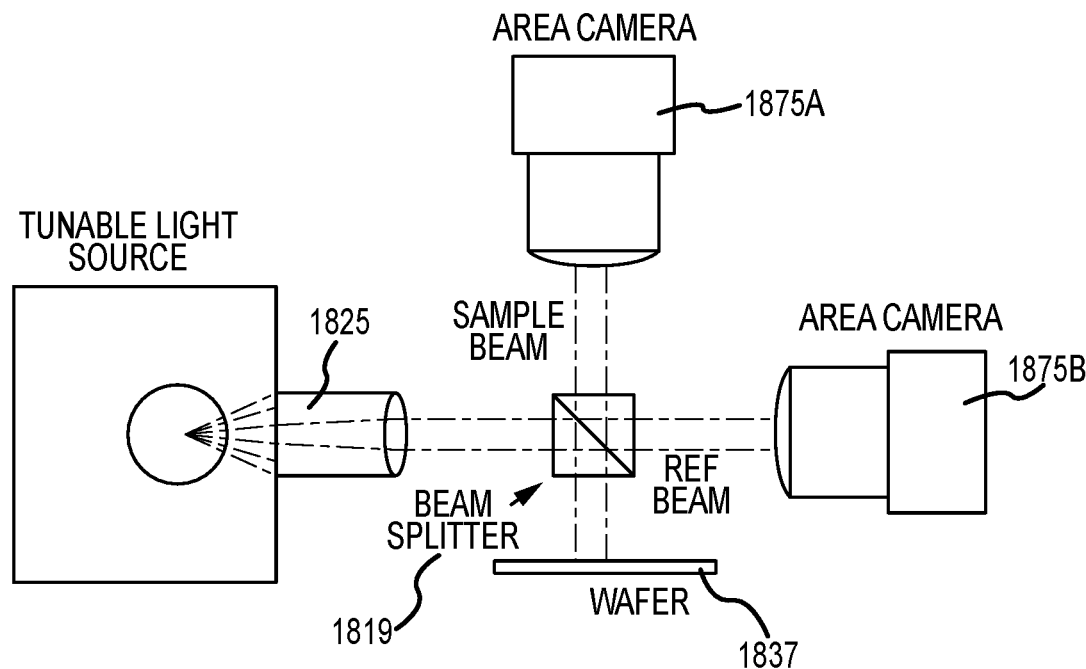
FIG. 18 is a schematic of an exemplary metrology architecture for a vertical silicon nanowire array on a wafer scale sufficient to provide a set of light reflectance data for a subject nanophotonic device.

This disclosure models the example for a factory with throughput of 60 wafers/hr on 100 mm wafers. From Equation 11 we calculate the allowable characterization time per wafer to be 60 s/wafer. The system we would use to characterize vSiNWs would involve a tunable light source and one or more monochrome area cameras. The tunable light source will allow us to investigate the state which is the spectral content of the light irradiating the vSiNW array. This system is shown schematically in FIG. 18.

Based on previous experiments we have done, we choose a FOV of 20×20 mm Given the area of the wafer and the area of the FOV it will take 20 different FOVs to cover the full wafer area. This means the system will have to move to a new FOV 19 times during the measurement. Based on a system we have used in our lab each move could take ~0.1 s making the sum time of the movements between FOVs equal to 1.9 s. If we want to characterize 10 different spectral bands there will be 9 movements between different spectral bands which also may take ~0.1 s each move or 0.9 s total in each FOV. Then this gets multiplied by the number of FOVs and we see that the total time spent moving between states will be 18 s.

From Equation 13 we calculate that there will be 40.1 s left for the total sum of acquisition times. Since there will be 10 acquisitions in each of the 20 FOVs (200 total acquisitions) that leaves 0.201 s for each acquisition. In our experience inspecting vSiNW arrays the camera acquisition times are significantly less than this (on the order of 10's of ms).

Diffractive Nanophotonic Devices

Nanophotonic devices which have a diffractive functionality can be characterized with functional metrology in one or both of two ways: 1) by varying the camera's angular orientation with respect to the device and 2) by varying the angle of illumination of the device. Changing these angular orientations allows the system to characterize the ability of the device to diffract incoming light into a variety of angles. This of course can be done with respect to spectral band and polarization state.

General Notes

It should be noted that on mature production lines the metrology usually does not need to characterize 100% of the product. A much smaller percentage of the product is characterized and statistics are used to relate this to the rest of the product, so this metrology does not necessarily need to hit the 100% target. Factory lines that are still being qualified however, need more extensive characterization, upwards of 100%, and thus 100% was targeted in this analysis.

Example 2. Performing Root-Cause Analysis on a WGP

Figure 12:
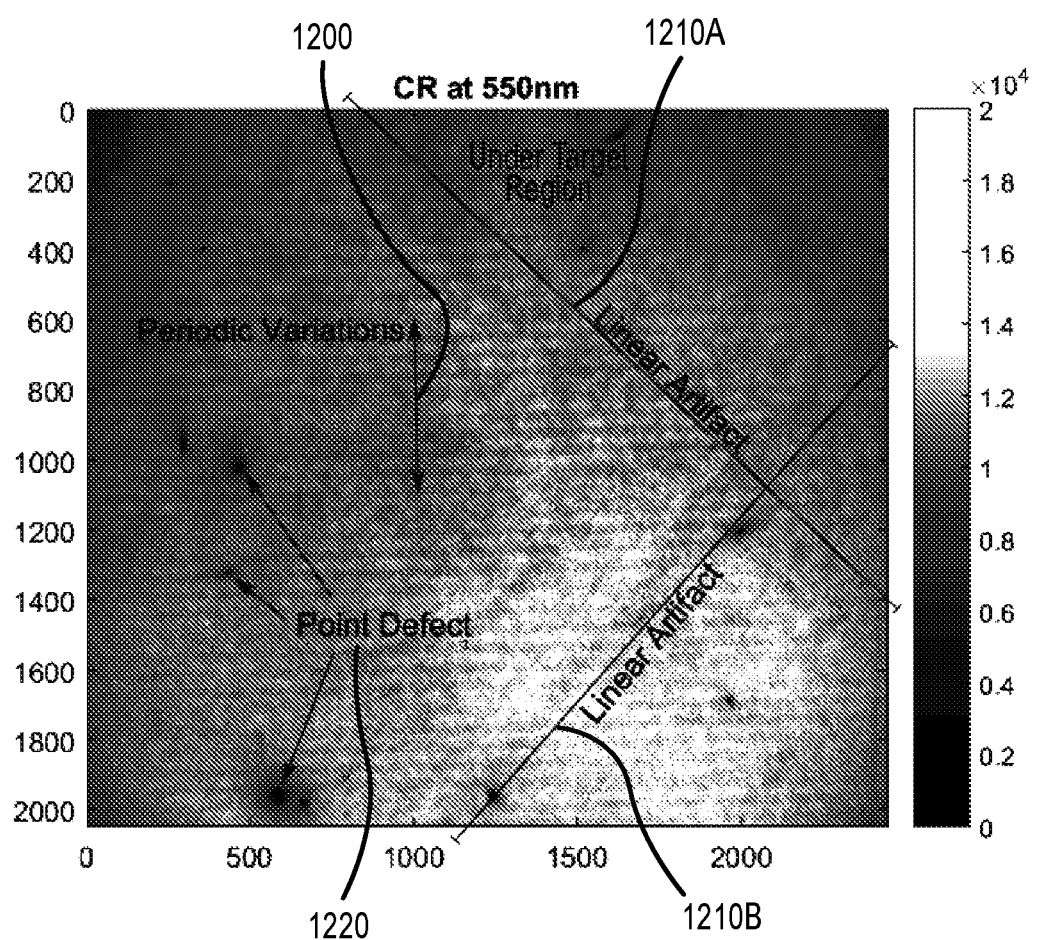
FIG. 12 is an annotated image of the defects shown on a nanophotonic device of FIG. 4 subject to metrology set forth in FIGS. 6-11.

FIG. 12 shows the CR map in a 16×19 mm field (2048× 2448 pixels) of a WGP in a narrow spectral band centered around 550 nm. This WGP was fabricated on a glass wafer. One can note the presence of many different defects (e.g., 1200, 1210, and 1220) each with unique functional and spatial signatures. Being that we are only looking at one wafer, we cannot determine the temporal signature. This WGP has gone through the following fabrication processes: Metal deposition (normal incidence), Imprint, Descum Etch (to break through the residual layer thickness from the imprint), and the Etch which transfers the imprinted features into the metal coated substrate.

In Table 9, root-cause analysis was performed following the procedure described above for some of the visible defects based on known process errors like the ones tabulated. In this case nanophotonic property is the CR of the WGP.

TABLE 9

Defects seen in FIG. 12, their signatures, possible root-causes, and tests.

| Defect Type | Description | Functional Signature | Spatial Signature | Possible Root Causes | Test |
|---|---|---|---|---|---|
| Point defect (1220) | There are many points where the features are clearly missing | Very poor | Localized, substantially circular, Variety of scales | Particle during imprint Air bubble Template defect Direct scratch | Clean template to eliminate particles. If repeating could be template defect. |
| Periodic Variations (1200) | There is clearly a periodic pattern running top to bottom over entire field. The lines run in the direction of the WGP lines. | Variations | 0.4 mm period, directional in direction of WGP lines | Drop dispense error Anisotropic drop spreading (non ideal drop pattern) Template feature variations Wafer topography | Test new drop pattern |
| Linear Artifact (1210A, 1210B) | Diagonal running linear artifact | Variations | Diagonal, very linear | Scratch on wafer Template artifact | Test to see if it is repeating |

In all cases, there are many possible root-causes that have the functional and spatial signature of the defect. The lack of the temporal signature makes the root-cause analysis significantly more difficult. A column of the table describes what further tests could be run to help eliminate certain root-causes and in many cases this test is related to obtaining a temporal signature, expressing its importance.

Point Defects

Clearly something caused missing features in these areas. Particles are ruled out during etch for the point defects identified in FIG. 12, because particles during etch create affected areas roughly the size of the particles and these affected areas, which are sometimes almost a mm across, are much larger than normal particles. Particles during the imprint however, create affected areas much larger than the particles themselves so this could be a possible root cause. Air bubbles are also a possible root cause, but usually affect much smaller areas (micron scale) and usually don't produce a halo of lower CR surrounding the defect. The point defects could also be due to template defects, but usually these are not as substantially circular nor are they surrounded by halos. Regardless, if the template is cleaned and the point defects are not mitigated, this is evidence that the template could have permanent defects. The point defects, of course, could just be scratches that were made directly on the device through poor handling. This could be ruled out be making sure to handle the samples with the utmost care. Based on this analysis, the point defects are most likely due to particles during imprint.

The light scatters off of pinholes such as these point defects as it transmits through the WGP. This could have some contribution to the halo that is seen around the point defects. Also, these areas end up saturating the camera pixels causing some overflow. The contribution of these effects can be determined to make sure the halo is not entirely due to reasons other than particle exclusions during imprint.

Periodic Variation

A well-defined periodic pattern is seen running top to bottom in the image. This says that the CD's of the WGP lines are varying. The lines of this pattern are in the direction of the lines on the WGP, and since directional drop spreading happens in the direction of grating features. Furthermore, the periodic variation has a well-defined period of ~0.4 mm which corresponds well to the drop pattern that was used. Thus, this was identified as a spreading error caused by non-ideal drop pattern.

Linear Artifact

Linear artifacts are seen which run in both diagonal directions. The similarity of the artifacts running in each direction suggests they are related. However, the problem being related to drop dispense issues like deviated nozzles, clogs, and partial clogs can be ruled out because—although these have linear spatial signatures—they are only seen in one linear direction. The only process error known to cause this spatial signature are template defects. Templates are fabricated using e-beam and there can be linear artifacts created in this process along with a host of others. Template defects are numerous enough to warrant being defined on an individual basis.

Example 3. System Architecture for a Polarizer Device

Figure 6A:
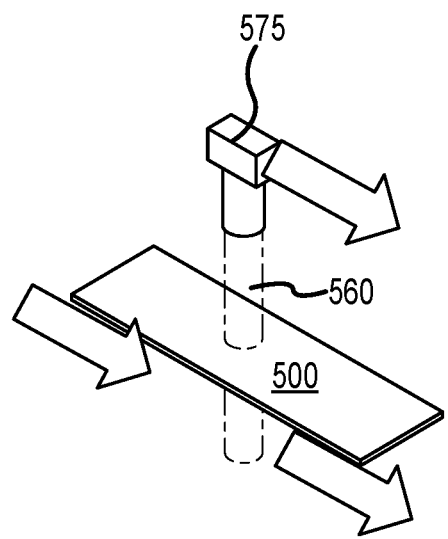
FIG. 6A is a schematic showing a metrology architecture according to this disclosure to account for a moving sample subject to imaging.
Figure 6B:
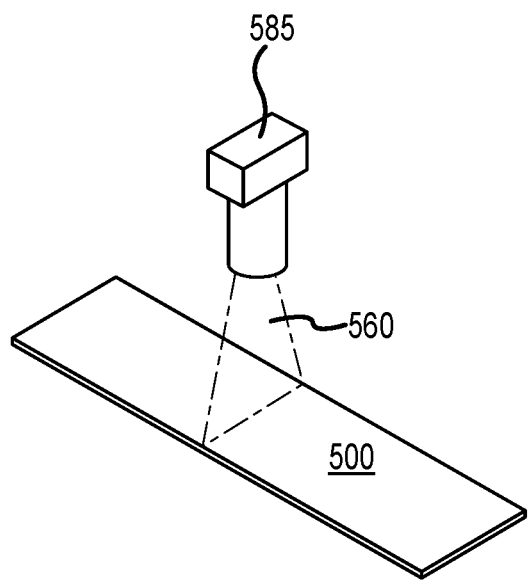
FIG. 6B is a schematic showing a metrology architecture according to this disclosure to account for a moving sample subject to imaging by installing a line screen camera in proper position.
Figure 6C:
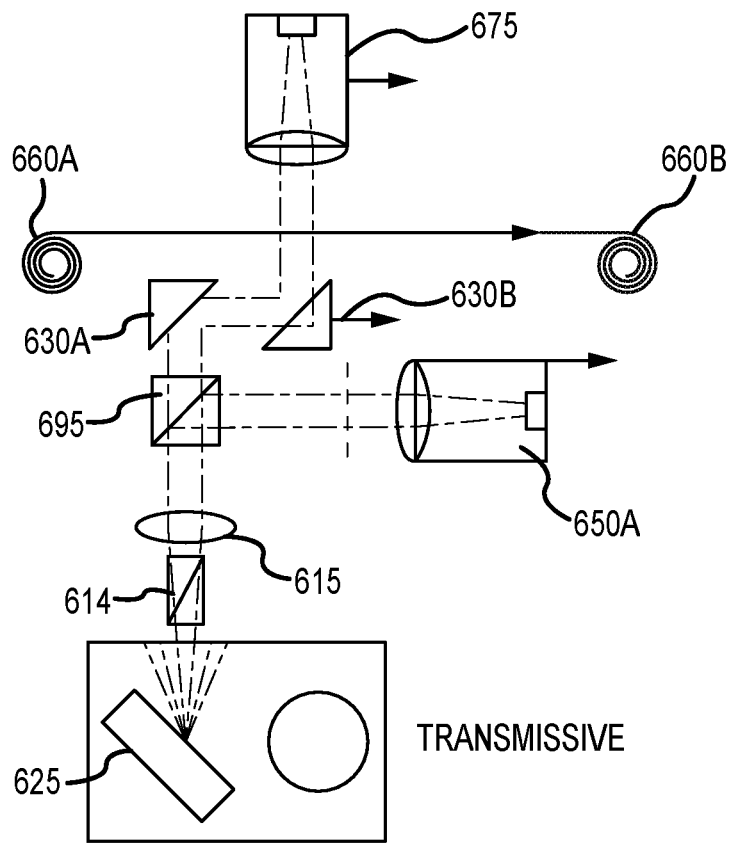
FIGS. 6C and 6D are schematic illustrations of respective transmissive and reflective metrology architectures to account for a moving sample as discussed herein.
Figure 6D:
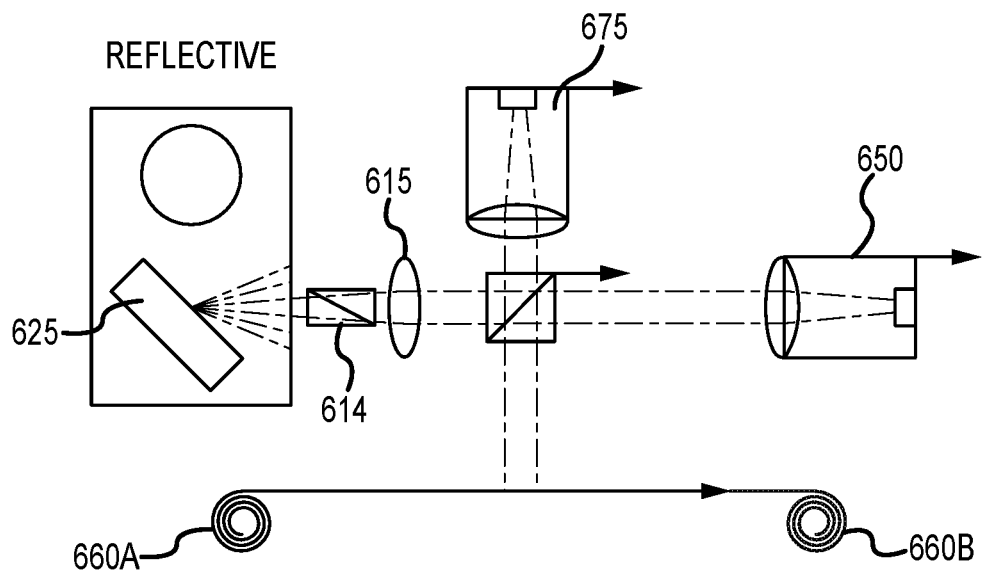
Figure 7:
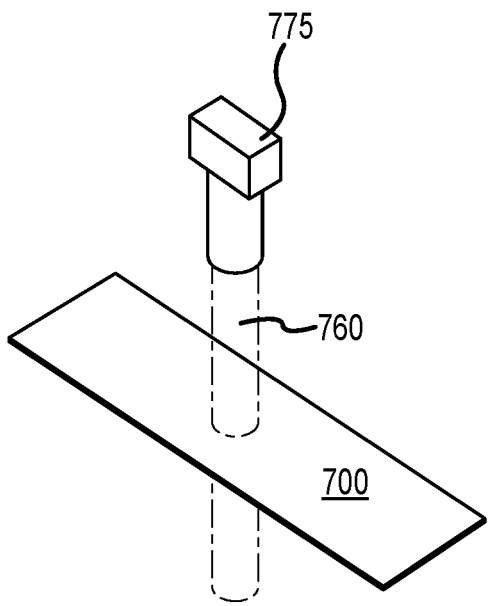
FIG. 7 is a schematic illustration of a metrology architecture for subjecting a wire grid polarizer to the contrast ratio and transmission intensity analysis described herein.
Figure 8:
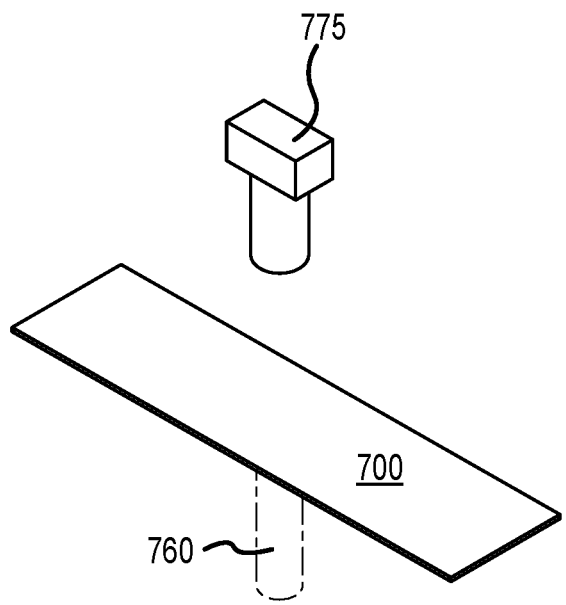
FIG. 8 is a schematic illustration of a metrology architecture for subjecting a wire grid polarizer to the contrast ratio and transmission intensity analysis described herein.
Figure 9:
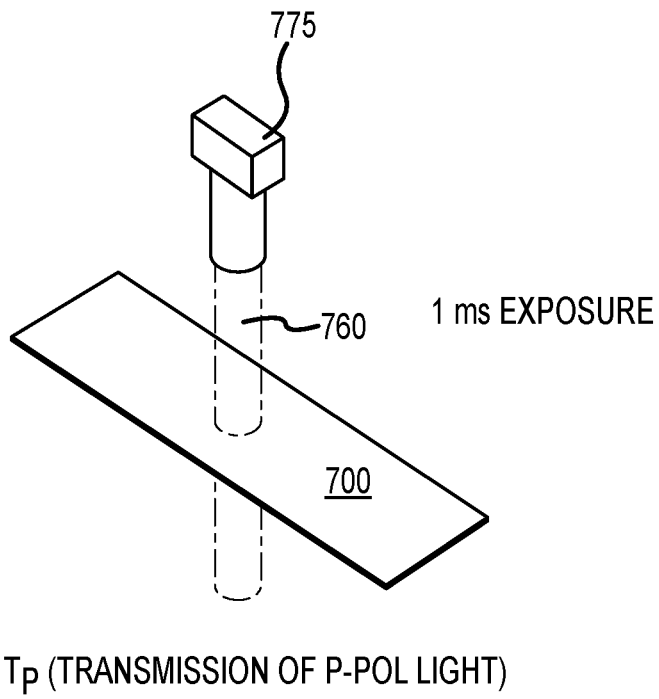
FIG. 9 is a schematic illustration of a metrology architecture and exposure time constraint for subjecting a wire grid polarizer to the contrast ratio and transmission intensity analysis for p-polarization as described herein.
Figure 10:
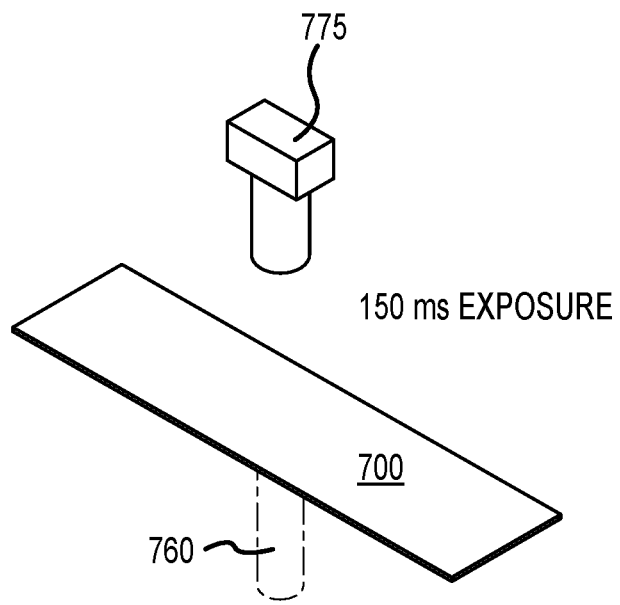
FIG. 10 is a schematic illustration of a metrology architecture and exposure time constraint for subjecting a wire grid polarizer to the contrast ratio and transmission intensity analysis as a function of the s-polarization as described herein.
Figure 11A:
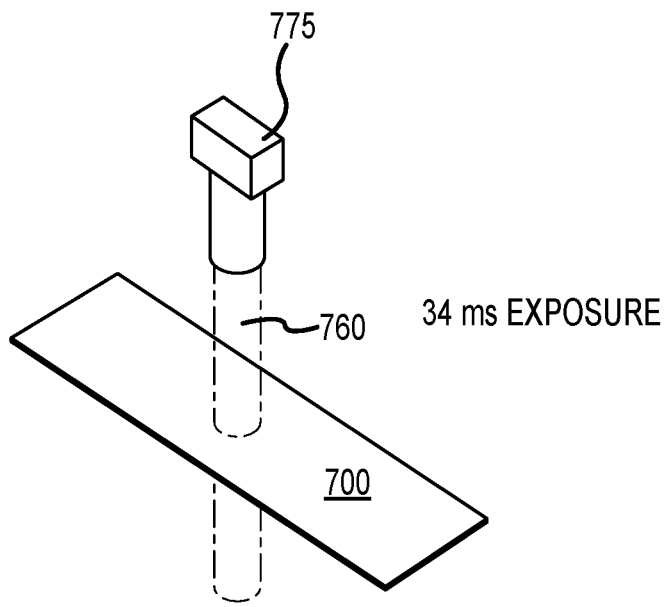
FIGS. 11A and 11B are schematic illustrations of a metrology architecture, exposure time constraints, and transition delays caused by a change in the polarization state for subjecting a wire grid polarizer to the contrast ratio and transmission intensity analysis as a function of the s-polarization as described herein.
Figure 11B:
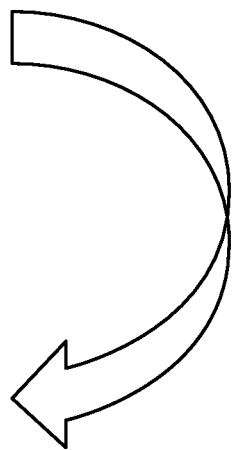
Figure 11B:
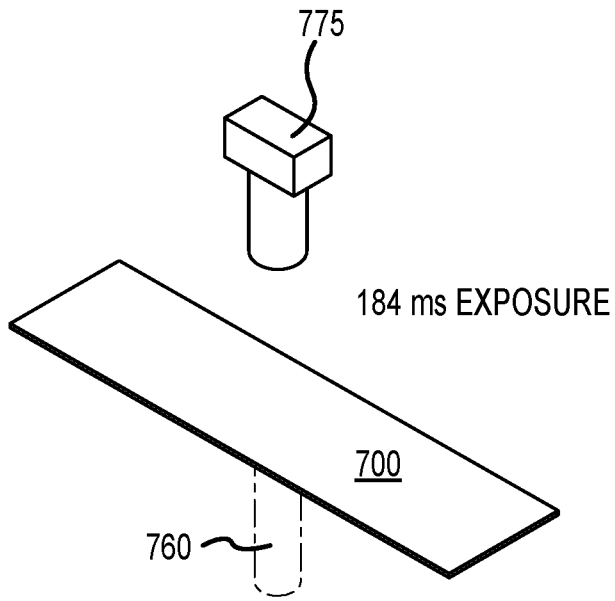
Figure 11C:
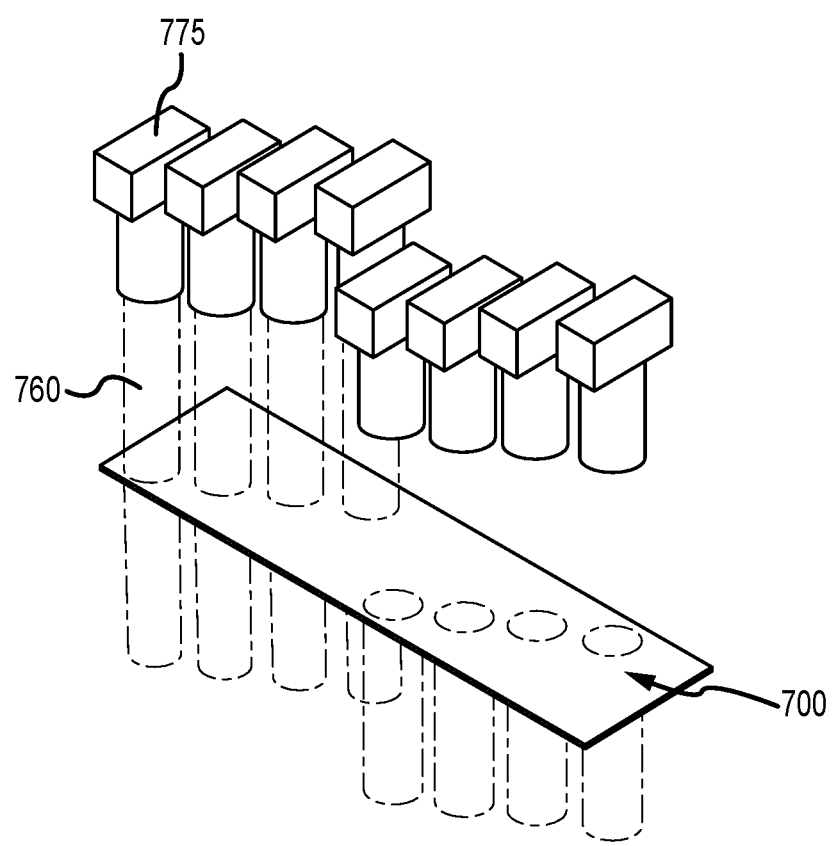
FIG. 11C is a schematic illustration of a metrology system as shown in FIGS. 7-11B and configured with parallel polarization architectures for respective Tp and Ts analysis simultaneously.

FIGS. 6-11 illustrate an R2R metrology architecture to account for a moving device as shown in FIG. 6A (i.e., the reader camera 575 moves with the roll 500). This could be true for transmitted light (560) directed from the bottom of the roll (500) or reflected light (560) on the roll. Otherwise, another solution is to use a line scan camera (585), such as a time delay integration, as shown in FIG. 6B. In FIGS. 7 and 8, the camera (775) must expose long enough to get a good signal to noise ratio. The camera (775) gathers pixel data on a frame by frame basis regarding the roll in the camera field of view of the transmitted light (760) through the roll (700) for when the transmitted light is p-polarized (Tp) and then again for when the transmitted light is s-polarized (Ts). The exposure would be short for Tp (transmission of p-polarized light of FIG. 7), but long for Ts (transmission of s-polarized light of FIG. 8). FIGS. 9 and 10 illustrate measuring Tp and Ts in order to calculate a CR (CR=Tp/Ts), so that only one measurement is needed for each polarization state. In one example, only a wavelength of 400 nm needs to be measured because Tp and CR are higher at longer wavelengths. FIGS. 11A and 11B show a non-limiting example in which the camera/reader takes an additional 33 ms to read a frame at 30 frames per second and considering a 1 ms exposure time results in a total acquisition time of 34 ms, then the system adds about 500 ms to change the polarization state of the beam, and then a longer acquisition time of 184 ms is done to measure Ts. This must be done across the fields necessary to cover the width of the roll. In one non-limiting example, the system adds about 500 ms for each move between fields. Variations of the system are embodied herein such as measuring the CR for two wavelengths by adding time (e.g., 500 ms) for changing the wavelength and adding additional time (e.g. an additional 500 ms) for changing the polarization again. The capture time is multiplied accordingly. FIG. 11C shows a combination of the same wherein all of the movements except for wavelength changes could be eliminated by using two dedicated, parallelized systems (one for Tp, one for Ts).

Details of the system are shown in FIGS. 6C and 6D for respective transmissive and reflective operations in which a rolling device (660A, 660B) moves a roll through the system such that the roll is subject to a sample beam from a tunable light source (625) directed through a polarizer (614) and a lens (615), a beam splitter (695), mirrors (630A, 630B) that are adjustable in separation distance, and a reader camera (675). A reference beam is read by the reader camera (650A).

Additional Embodiments

1. A large area functional metrology system, comprising:
a tunable light source;
a reference optical device;
a beam splitter;
beam optics; and
a camera.
2. The system of Embodiment 1, wherein the system is used in roll-to-roll manufacturing of nanophotonic devices.
3. The system of Embodiment 1, wherein a continuously rotating diffraction grating is used to substantially eliminate time spent rotating the diffraction grating between adjacent spectral bands.
4. The system of Embodiment 1, wherein the widths of the spectral bands are substantially dictated by the exposure time of the camera and the speed of rotation of the diffraction grating.
5. The system of Embodiment 2, wherein the camera and beam optics move synchronously with the roll to substantially eliminate relative motion between the camera and the roll.
6. The system of Embodiment 2, wherein spectral images can be taken simultaneously with an aerial image capture.
7. The system of Embodiment 2, wherein the camera takes a series of short exposure images and the rows of each image corresponding to a given strip of a roll.
8. The system of Embodiment 7, wherein the images corresponding to a given strip of a roll are accumulated such that the final accumulated signal has substantially high signal to noise ratio.
9. The system of Embodiment 2, wherein the system uses a support on a portion of the free span of a web to substantially eliminate out of plane displacements and focusing blurs on lengths of the roll which are unsupported.
10. The system of Embodiment 1, wherein the system is used in wafer-scale manufacturing of nanophotonic devices.
11. The system of Embodiment 1, wherein a dual-beam architecture is used.
12. The system of Embodiment 1, wherein the system uses color filters to capture multiple spectral bands.
13. The system of Embodiment 1, wherein the system substantially achieves desirable throughput for specific device manufacturing scenarios by determining one or more of the following: the number of required fields, the number and widths of spectral bands, the number of polarization states, or the maximum allowable exposure time that can be used by individual cameras.
14. The system of Embodiment 13, wherein the number of devices sampled decreases as the roll progresses to substantially maintain throughput.
15. The system of Embodiment 1, wherein a collection of said optical function maps contains functional, spatial, or temporal information that can be used to substantially identify specific types of defects in said devices.
16. The system of Embodiment 15, wherein a defect is substantially linked to a root cause from a specific fabrication process error.
17. The system of Embodiment 1, which can be used for manufacturing a nanoscale device if the features of the device which also have some nanophotonic effects that can be correlated to other functional parameters of the device.
18. The system of Embodiment 1, where the system is used for real-time monitoring of a nanofabrication process.
19. The system of Embodiment 1, where the system is compatible with vacuum processing of a nanoscale device.
20. The system of Embodiment 2, where the system uses tracking registration to mark on the roll for a feedback control loop which substantially stabilizes the relative position between the roll and a camera.
21. The system of Embodiment 1, wherein multiple systems are placed such that each system substantially characterizes a portion of the substrate which another system does not.
22. The system of Embodiment 1, wherein the nanophotonic device is a wire-grid polarizer and the optical function is transmission intensity at one or more polarization states or wavelength spectral bands or viewing angles or illumination angles.
23. The system of Embodiment 1, wherein the nanophotonic device is a wire-grid polarizer and the optical function is contrast ratio at one or more wavelength spectral bands or viewing angles or illumination angles.
24. The system of Embodiment 1, wherein the nanophotonic device consists of a nanowire array and the optical function is reflection intensity at one or more polarization states or wavelength spectral bands or viewing angles or illumination angles.
25. The system of Embodiment 1, wherein the nanophotonic device consists of a nanowire array and the optical function is transmission intensity at one or more polarization states or wavelength spectral bands or viewing angles or illumination angles.
26. The system of Embodiment 1, wherein the nanophotonic device consists of a nanowire array and the optical function is scattering intensity at one or more polarization states or wavelength spectral bands or viewing angles or illumination angles.
27. The system of Embodiment 1, wherein the nanophotonic device consists of a nanoparticle array and the optical function is reflection intensity at one or more polarization states or wavelength spectral bands or viewing angles or illumination angles.

28. The system of Embodiment 1, wherein the nanophotonic device consists of a nanoparticle array and the optical function is transmission intensity at one or more polarization states or wavelength spectral bands or viewing angles or illumination angles.

29. The system of Embodiment 1, wherein the nanophotonic device consists of a nanoparticle array and the optical function is scattering intensity at one or more polarization states or wavelength spectral bands or viewing angles or illumination angles.

30. The system of Embodiment 1, wherein the nanophotonic device consists of a diffraction optic and the optical function is reflection intensity at one or more polarization states or wavelength spectral bands or viewing angles or illumination angles.

31. The system of Embodiment 1, wherein the nanophotonic device consists of a diffraction optic and the optical function is transmission intensity at one or more polarization states or wavelength spectral bands or viewing angles or illumination angles.

32. The system of Embodiment 1, wherein the nanophotonic device consists of a diffraction optic and the optical function is scattering intensity at one or more polarization states or wavelength spectral bands or viewing angles or illumination angles.

33. A method for detecting a defect in the manufacturing of a nanophotonic device, comprising the steps:
measuring an optical function using the system of claim 1, wherein the optical function is measured at one or more points in an area of a nanophotonic device on a substrate, wherein the optical function is selected from wavelength spectral band, polarization state, illumination angle, and viewing angle; and compiling a multi-dimensional data set to form an optical function map of the device.

34. A large area functional metrology system wherein said system:
Is used in the inspection of a nanophotonic device with a nanophotonic property
Comprises of one or more of the following parts: a light source, an optical component, and a camera sensor
Irradiates light on said nanophotonic device wherein said nanophotonic device interacts with said light to provide one or more said nanophotonic properties
Records an image on said camera sensor with said interacted light, wherein said image is taken as a function of one or more states.
Wherein said states are one or more of the following: 1. Spectral content of said light irradiating said nanophotonic device, 2. Polarization content of said light irradiating said nanophotonic device, 3. Angle of incidence that said light irradiating said nanophotonic device makes with a surface of said nanophotonic device, 4. Viewing angle of said camera sensor, 5. Range of acceptance angles of said camera, 6. Spectral content of said interacted light irradiating said camera sensor, 7. Polarization content of said interacted light irradiating said camera sensor.
Wherein said nanophotonic device is a device which has a minimum feature size on the order of the wavelength of said light irradiated on it and the geometry or material properties of said features are designed to provide one or more said nanophotonic properties as output.
Records an image on said camera sensor of a reference which is one of the following: 1. Light from a mirror, 2. Unobstructed light from said light source wherein a location of an object plane and image plane as defined by a position of said camera, said optical components, and said light source is the same as when said image of said light after interacting with said nanophotonic device is recorded, wherein said image of said reference is taken as a function of a known state.
Processes said image with said light after interacting with said nanophotonic device and said image of said reference to calculate said nanophotonic property at one or more points in an area of said nanophotonic device as a function of said states.
Wherein said nanophotonic property is one of the following: 1. Transmittance, 2. Reflectance, 3. Absorptance, 4. Diffraction efficiency, 5. Scattering efficiency, 6. Polarization efficiency, 7. Polarization conversion efficiency, 8. Haze, 9. Contrast ratio 35. The system of Embodiment 34, wherein said system is used in wafer-scale manufacturing of said nanophotonic devices.

36. The system of Embodiment 34, wherein said system is used in roll-to-roll manufacturing of said nanophotonic devices.

37. The system of Embodiment 34, wherein said system is used in sheet-to-sheet manufacturing of said nanophotonic devices.

38. The system of Embodiment 34 in which the nanophotonic devices are one of the following: nanofabricated polarizer, metal mesh grid, anti-reflector, substantially perfect absorber, substantially perfect reflector, nanowire array, nanowire dispersion, nanoparticle array, nanoparticle dispersion, diffractive optic or nanostructural color device.

39. The system of Embodiment 34 wherein the nanophotonic device is a nanofabricated polarizer and the nanophotonic property is transmittance one or more states.

40. The system of Embodiment 34 wherein the nanophotonic device is a nanofabricated polarizer and the nanophotonic property is contrast ratio at one or more states.

41. The system of Embodiment 34 wherein the nanophotonic device is a metal mesh and the nanophotonic property is transmittance at one or more states.

42. The system of Embodiment 34 wherein the nanophotonic device is a metal mesh and the nanophotonic property is haze at one or more states.

43. The system of Embodiment 34, wherein a continuously rotating diffraction grating is used to substantially eliminate time spent rotating the diffraction grating between adjacent spectral bands.

44. The system of Embodiment 43, wherein the widths of the spectral bands are substantially dictated by the exposure time of the camera and the speed of rotation of the diffraction grating.

45. The system of Embodiment 34 wherein said part of said system moves synchronously with a moving substrate to substantially eliminate relative motion between said part and the substrate.

46. The system of Embodiment 34, wherein said part of said system is a camera sensor and further said camera sensor is a hyperspectral linescan camera sensor.

47. The system of Embodiment 34, wherein the nanophotonic device uses a support to substantially eliminate out of plane displacements that cause focusing blurs.

48. The system of Embodiment 34, wherein said part of said optical component is a lens with depth of focus that substantially eliminates focusing blurs caused by out-of-plane displacements of the substrate.

49. The system of Embodiment 34, wherein the system uses a registration mark on the substrate and a feedback control loop which adjusts the focus plane of the camera to substantially eliminate the focusing blurs caused by the out-of-plane displacement of the substrate.

50. The system of Embodiment 34, wherein the system uses tracking registration marks on the substrate for a feedback control loop which substantially aligns the substrate in-plane.

51. The system of Embodiment 34, wherein a dual-beam architecture is used.

52. The system of Embodiment 34, where the system is used for real-time monitoring of a nanofabrication process.

53. The system of Embodiment 34 in which two such systems are placed such that each system substantially characterizes a portion of the substrate which the other system does not.

54. The system of Embodiment 34, wherein the system substantially achieves desirable throughput for specific device manufacturing scenarios by determining one or more of the following: the number of required systems, the number of required camera sensors, the number of nanophotonic properties, the number of states, and the maximum allowable characterization time.

55. A method for using the functional metrology system of Embodiment 34 to detect a defect in a nanophotonic device Wherein said defect is a deviation from the intended performance of said nanophotonic device and causes an undesirable change in a nanophotonic property of said nanophotonic device.

56. The method of Embodiment 55 further including an approach that substantially links the defect to a root-cause wherein said root-cause is a deviation from a desired nanofabrication process.

57. The method of Embodiment 55, wherein the root-cause can be from a J-FIL inkjet system error.

58. The method of Embodiment 55, wherein the root-cause can be from a PFIL slot die process error.

59. The method of Embodiment 55, wherein the root-cause can be from an imprinting process error.

60. The method of Embodiment 55, wherein the root-cause can be from an etch process error.

61. The method of Embodiment 55, wherein the root-cause can be from a glancing angle metal deposition error.

Unless defined otherwise, all technical and scientific terms used herein have the same meanings as commonly understood by one of skill in the art to which this disclosure belongs. Publications cited herein and the materials for which they are cited are specifically incorporated by reference.

Those skilled in the art will appreciate that numerous changes and modifications can be made to the preferred embodiments and that such changes and modifications can be made without departing from the spirit of the disclosure. It is, therefore, intended that the appended claims cover all such equivalent variations as fall within the true spirit and scope of the disclosure.

The invention claimed is:

1. A large area functional metrology system for inspecting a nanophotonic device, the large area functional metrology system comprising:
a light source configured to irradiate light on a portion of a nanophotonic device;
an optical component;
a camera sensor to record an image of a portion of the nanophotonic device subjected to the light irradiating from the light source,
wherein the image is taken as a function of one or more states;
a detector to process the image to detect one or more defects in the nanophotonic device; and
a computational device to link the one or more defects to a root-cause corresponding to a deviation from a nanofabrication process.

2. The large area functional metrology system of claim 1, further comprising:
a computational device to calculate a nanophotonic property at one or more points in an area of the nanophotonic device as a function of the one or more states; and
a defect analyzer to use the nanophotonic property identified by the computational device to detect defects.

3. The large area functional metrology system of claim 1, wherein the one or more states are defined and include one or more of the following: 1) spectral content of the light irradiating the nanophotonic device, 2) polarization content of the light irradiating the nanophotonic device, 3) angle of incidence that the light irradiating the nanophotonic device makes with a surface of the nanophotonic device, 4) viewing angle of the camera sensor, 5) range of acceptance angles of the camera sensor, 6) spectral content of interacted light reflected from the nanophotonic device and irradiating the camera sensor, or 7) polarization content of the interacted light irradiating the camera sensor.

4. The large area functional metrology system of claim 1, wherein the nanophotonic device has a minimum feature size on an order of a wavelength of the light irradiated on the nanophotonic device and wherein a geometry or material property of features of the nanophotonic device provide one or more nanophotonic properties in response to the light irradiated by the light source.

5. The large area functional metrology system of claim 4, wherein the one or more nanophotonic properties include at least one of the following: 1) transmittance, 2) reflectance, 3) absorptance, 4) diffraction efficiency, 5) scattering efficiency, 6) polarization efficiency, 7) polarization conversion efficiency, 8) haze, or 9) contrast ratio.

6. The large area functional metrology system of claim 5, wherein the nanophotonic device is a nanofabricated polarizer and the one or more nanophotonic properties include transmittance at one or more states, the nanophotonic device is a nanofabricated polarizer and the one or more nanophotonic properties include contrast ratio at one or more states, the nanophotonic device is a metal mesh and the one or more nanophotonic properties include transmittance at one or more states, or the nanophotonic device is a metal mesh and the one or more nanophotonic properties include haze at one or more states.

7. The large area functional metrology system of claim 1, wherein the camera sensor records a reference image from light from a reference, wherein the reference image is used to calculate a nanophotonic property.

8. The large area functional metrology system of claim 1, wherein large area functional metrology system is part of a wafer-scale manufacturing system, roll-to-roll manufacturing system, or sheet-to-sheet manufacturing system creating the nanophotonic device.

9. The large area functional metrology system of claim 1, wherein the nanophotonic device is a nanofabricated polarizer, a metal mesh grid, an anti-reflector, a substantially perfect absorber, a substantially perfect reflector, a nanowire array, a nanowire dispersion, a nanoparticle array, a nanoparticle dispersion, a diffractive optic, a metamaterial, or a nanostructural color device.

10. The large area functional metrology system of claim 1, wherein a continuously rotating diffraction grating is used, and wherein widths of spectral bands are substantially dictated by an exposure time of the camera sensor and a speed of rotation of the diffraction grating to substantially eliminate time spent rotating the diffraction grating between adjacent spectral bands.

11. The large area functional metrology system of claim 1, wherein the camera sensor moves synchronously with a moving substrate to substantially eliminate relative motion between the camera sensor and a substrate.

12. The large area functional metrology system of claim 1, further comprising a support upon which the nanophotonic device is placed to substantially eliminate out of plane displacements that cause focusing blurs in the image taken by the camera sensor.

13. The large area functional metrology system of claim 1, wherein the optical component includes a lens with depth of focus that substantially eliminates focusing blurs caused by out-of-plane displacements of a substrate.

14. The large area functional metrology system of claim 1, further comprising a control system to identify a registration mark on a substrate of the nanophotonic device and adjust a focus plane of the camera sensor to substantially eliminate focusing blurs caused by out-of-plane displacement of the substrate.

15. A method for real-time monitoring of a nanofabrication process, the method comprising:
   irradiating a light on a portion of a nanophotonic device;
   recording an image of a portion of the nanophotonic device subjected to the light,
      wherein the image is taken as a function of one or more states;
   processing the image to detect one or more defects in the nanophotonic device; and
   linking the one or more defects to a root-cause, wherein the root-cause is a deviation from a desired nanofabrication process.

16. The method of claim 15, wherein the defect is a deviation from an intended performance of the nanophotonic device and causes an undesirable change in a nanophotonic property of the nanophotonic device.

17. The method of claim 15, wherein the root-cause is from a J-FIL inkjet system error, a PFIL slot die process error, an imprinting process error, an etch process error, or a glancing angle metal deposition error.

18. The method of claim 15, wherein the portion of the nanophotonic device is a first portion and the method further comprising:
   irradiating a second light on the first portion or a second portion of the nanophotonic device;
   recording a second image of the first portion or the second portion of the nanophotonic device subjected to the second light; and
   processing the second image to detect one or more additional defects in the nanophotonic device.

19. The large area functional metrology system of claim 1, wherein the root-cause is from at least one of an inkjet system error, a slot die process error, an imprinting process error, an etch process error and a glancing metal deposition error.

* * * * *